United States Patent
Kheirandish et al.

(10) Patent No.: US 9,765,209 B2
(45) Date of Patent: Sep. 19, 2017

(54) IN-SITU REACTOR BLEND OF A ZIEGLER-NATTA CATALYSED, NUCLEATED POLYPROPYLENE AND A METALLOCENE CATALYSED POLYPROPYLENE

(75) Inventors: Saeid Kheirandish, Neuss (DE); Petar Doshev, Linz (AT); Pauli Leskinen, Helsinki (FI); Bo Malm, Espoo (FI)

(73) Assignee: Borealis AG (AT)

( * ) Notice: Subject to any disclaimer, the term of this patent is extended or adjusted under 35 U.S.C. 154(b) by 529 days.

(21) Appl. No.: 14/125,152

(22) PCT Filed: May 21, 2012

(86) PCT No.: PCT/EP2012/059319
§ 371 (c)(1),
(2), (4) Date: Jan. 15, 2014

(87) PCT Pub. No.: WO2012/171745
PCT Pub. Date: Dec. 20, 2012

(65) Prior Publication Data
US 2014/0128549 A1  May 8, 2014

(30) Foreign Application Priority Data
Jun. 15, 2011 (EP) .................................. 11169930

(51) Int. Cl.
*C08L 23/12* (2006.01)
*C08F 10/06* (2006.01)
(Continued)

(52) U.S. Cl.
CPC .............. *C08L 23/12* (2013.01); *C08F 10/06* (2013.01); *C08L 23/10* (2013.01);
(Continued)

(58) Field of Classification Search
CPC ........... C08L 23/12; C08L 23/10; C08F 10/06
See application file for complete search history.

(56) References Cited

U.S. PATENT DOCUMENTS 6,503,993 B1    1/2003  Huovinen et al.
6,683,125 B1 *  1/2004  Augestad ............ C08F 297/083
                                                524/451

(Continued)

FOREIGN PATENT DOCUMENTS

EP    2014714 A1    1/2009
EP    2216347 A1    8/2010
(Continued)

OTHER PUBLICATIONS

Vincenzo Busico et al. "Microstructure of polypropylene", Prog. Polym. Sci. 26 (2001) 443-533.
(Continued)

*Primary Examiner* — Catherine S Branch
(74) *Attorney, Agent, or Firm* — Tarolli, Sundheim, Covell & Tummino LLP

(57) ABSTRACT

Propylene homo- or copolymer composition comprising an in-situ reactor blend of a Ziegler-Natta catalysed, nucleated polypropylene (znPP) and a metallocene catalysed polypropylene (mcPP), in a weight ratio in the range of 6:94 to 50:50 (wt % znPP:wt % mcPP), preferably in the range of 10:90 to 44:56 (wt % znPP:wt % mcPP), having an excellent balance between optical properties, mechanical properties, thermal properties and processing properties; a process for its production and the use of a mixture of a Ziegler-Natta catalyst system and a metallocene catalyst system.

13 Claims, 1 Drawing Sheet comparison of tensile modulus of inventive examples (TEM IE) vs comparative examples (TEM CE)

(51) Int. Cl.
*C08L 23/10* (2006.01)
*C08F 4/659* (2006.01)
*C08F 110/06* (2006.01)
*C08F 210/06* (2006.01)
*C08F 4/6592* (2006.01)

(52) U.S. Cl.
CPC ...... *C08F 4/65912* (2013.01); *C08F 4/65927* (2013.01); *C08F 110/06* (2013.01); *C08F 210/06* (2013.01); *C08L 2205/02* (2013.01)

(56) References Cited

U.S. PATENT DOCUMENTS 6,747,103 B1 6/2004 Vestberg et al.
2009/0318621 A1 12/2009 Posch et al.

FOREIGN PATENT DOCUMENTS

EP 2230273 A1 9/2010
WO 9924478 A1 5/1999

OTHER PUBLICATIONS

Vincenzo Busico et al. "Full Assignment of the 13C NMR Spectra of Regioregular Polypropylenes: Methyl and Methylene Region", Macromolecules 1997, 30, 6251-6263.

Vincenzo Busico et al. "Alk-1-ene Polymerization in the Presence of a Monocyclopentadienyl Zirconium(IV) Acetamidinate Catalyst: Microstructural and Mechanistic Insights", Macromol. Rapid Commun. 2007, 28, 1128-1134.

H.N. Cheng "13C NMR Analysis of Ethylene-Propylene Rubbers", Macromolecules 1984, 17, 1950-1955.

Masahiro Kakugo et al. "13C NMR Determination of Monomer Sequence Distribution in Ethylene-Propylene Copolymers Prepared with o-TiC13-Al(C2H5hCl", Macromolecules 1982, 15, 1150-1152.

James C. Randall "A Review of High Resolution Liquid 13Carbon Nuclear Magnetic Resonance Characterizations of Ethylene-Based Polymers", JMS-Rev. Macromol. Chem. Phys., C29(2 & 3), 201-317 (1989).

Luigi Resconi et al. "Selectivity in Propene Polymerization with Metallocene Catalysts", Chem. Rev. 2000, 100, 1253-1345.

Gurmeet Singh et al. "Triad sequence determination of ehylene-propylene copolymers—application of quantitative 13C NMR", Polymer Testing 28 (2009) 475-479.

Wen-Jun Wang et al. "Structural Analysis of Ethylene/Propylene Copolymers Synthesized with a Constrained Geometry Catalyst", Macromolecules 2000, 33, 1157-1162.

Zhe Zhou et al. "A new decoupling method for accurate quantification of polyethylene copolymer composition and triad sequence distribution with 13C NMR", Journal of Magnetic Resonance 187 (2007) 225-233.

* cited by examiner

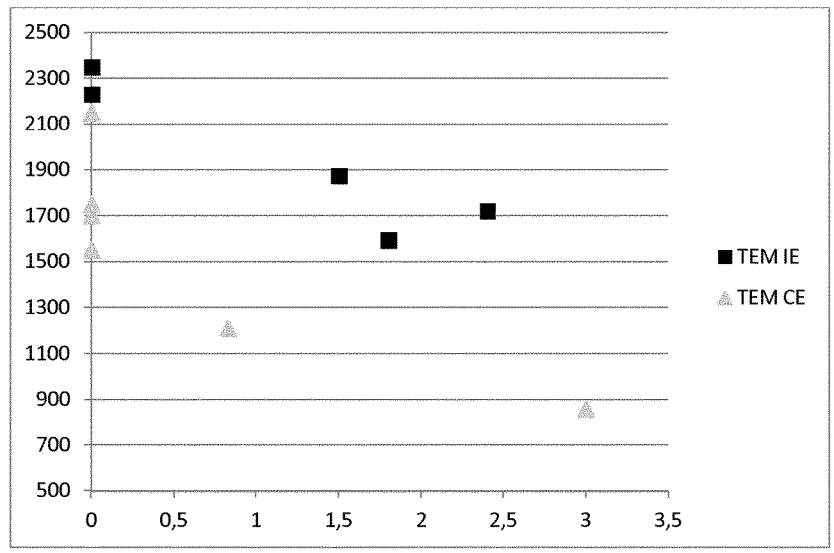
Figure 1: comparison of tensile modulus of inventive examples (TEM IE) vs comparative examples (TEM CE)
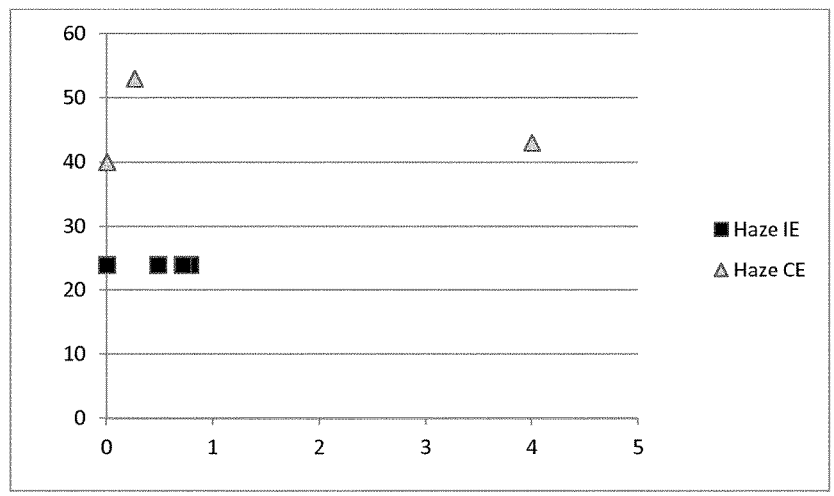
Figure 2: comparison of haze values of inventive examples (Haze IE) vs comparative examples (Haze CE)

IN-SITU REACTOR BLEND OF A ZIEGLER-NATTA CATALYSED, NUCLEATED POLYPROPYLENE AND A METALLOCENE CATALYSED POLYPROPYLENE

The present invention is related to a propylene homo- or copolymer composition which comprises an in-situ reactor blend of a Ziegler-Natta catalysed, nucleated polypropylene and a metallocene catalysed polypropylene, a process for its preparation using a special catalyst mixture and the special catalyst mixture itself.

Polypropylene has become one of the most widely used polymers due to its good combination of properties, which makes it useful for applications ranging from food packaging (film, bottle) to more demanding applications like pipes, fittings or foams.

For these different applications, polymers with very different properties are required. The main characteristics of these polymers are their isotacticity, on which stiffness is greatly dependent, melt flow rate (MFR), and molecular weight and the molecular weight distribution (MWD), which strongly affect processability. These features can be controlled by varying the process conditions and by using different catalyst systems.

The use of Ziegler-Natta type catalysts containing as essential components magnesium, titanium and halogen and metallocene catalysts for the polymerisation of propylene is well established in the art.

Numerous documents describe the use of Ziegler-Natta type catalysts either alone or more conventionally supported on a carrier, e.g. an oxide support such as silica or alumina. Such supported catalyst systems are used either without a cocatalyst or with a metal alkyl cocatalyst and in the presence of a compound acting as external donor as is well known in the art.

Metallocene catalysts are also widely employed and are conventionally used in combination with a cocatalyst as is well known in the art.

Metallocene catalysts used in the production of propylene homo- or copolymers generally offer good flexibility over chain structure and consequently, the crystalline structure of the polypropylene products. They furthermore offer remarkable hydrogen response leading to a final melt flow rate range, especially in the higher melt flow ends, that are not achievable using traditional Ziegler-Natta catalysts. This feature is especially desirable in addressing the problem of reducing organoleptic levels and taste and odour, but can also be a problem for products which need low melt flow rates, like pipes.

A further problem related to metallocene catalysed polypropylenes is that they usually have weak processability due to their narrow molecular weight distribution and inferior mechanical properties compared to Ziegler-Natta catalysed products.

It is also known to combine different catalysts to form multi-site, like dual-site catalyst systems or mixed catalyst systems. Such catalyst systems offer the skilled polymer chemist more scope for tailoring t properties of the polymer product since each site within such a catalyst may give rise to a polymer component having particular properties, e.g. desired mechanical or optical properties. For example dual-site or mixed catalyst systems are used in order to achieve a broad multimodal, like bimodal molecular weight distribution in the final polymer product. Such a distribution is desirable as the higher molecular weight component contributes to the strength of the end products made from the polymer while the lower molecular weight component contributes to the processability of the polymer.

However, the use of "mixed" catalyst systems is often associated with operability problems. For example, the use of two catalysts on a single support may be associated with a reduced degree of process control flexibility. Moreover, the two different catalyst/cocatalyst systems may interfere with one another—for example, the organoaluminium component which is often used in Ziegler-Natta catalyst systems may "poison" a metallocene catalyst.

Accordingly, a "mixed catalyst" process which avoids or at least mitigates some of these difficulties would be a useful addition to the art.

Thus there exists a need to maximize the benefits of each individual catalyst system (i.e. Ziegler-Natta and metallocene).

A further possibility to achieve the desired molecular weight and MWDs is blending of two or more polypropylenes or alternatively by multi-stage polymerisation.

From the patent literature several multistage processes for the polymerisation of olefins, Carrie d out in two or more reactors, are known and are of particular interest in industrial practice, due to the possibility of independently varying, in any reactor, process parameters such as temperature, pressure, type and concentration of monomers, concentration of hydrogen or other molecular weight regulators as well as catalyst systems used, which provides much greater flexibility in controlling the composition and properties of the end product than with single-stage processes.

Processes in several stages find application for example in the preparation of olefin (co)polymers with broad molecular weight distribution (MWD), by producing polymer species with different molecular weight in the various reactors.

For example, WO 96/11218 discloses a multistage process for the polymerisation of one or more than one olefin of the formula $CH_2=CHR$ in which R can be alkyl having 1-10 carbon atoms. In the first polymerisation stage one or more than one such olefin is or are polymerised by Ziegler-Natta catalysis to form particles of a first polymer. In the next polymerisation stage, a polymer of one or more than one such olefin is formed by metallocene catalysis on or in the particles of the first polymer, whereby the first catalyst is deactivated prior to the introduction of the second catalyst system.

Specifically, the process described in WO 96/11218 comprises a first stage in which a propylene polymer is produced in the presence of a titanium or vanadium catalyst, a second stage in which the titanium or vanadium catalyst is deactivated, and a third stage in which polymerisation is continued in the presence of a metallocene catalyst. Such a cascade process is believed to result in good homogenisation of the resulting polymer blend. However, the need to deactivate the first catalyst before the polymer particles can be impregnated with the second catalyst makes this process unnecessarily complex and not cost effective. A further disadvantage of this process is that the second catalyst is relatively quickly flushed out of the reactor as a result of the high throughput of polymer material into the third stage of the polymerisation process.

Although much development has been done in the field of polymerising propylene to yield polypropylene compositions with improved polymer property profile, it was impossible up to now to provide propylene homo- or copolymers with improved balance between optical properties, mechanical properties, thermal properties and processing properties.

For this reason there is still a need for propylene homo- or copolymer compositions, which fulfil the various demanding requirements in many end application areas of polymers, such as packaging, including food and medical packaging, fibres, pipe and automobile industry, thus showing the desired excellent balance between optical properties, mechanical properties, thermal properties and processing properties.

BRIEF DESCRIPTION OF THE DRAWINGS

FIG. 1 illustrates a plot showing comparison of tensile modulus of inventive examples (TEM IE) vs. comparative examples (TEM CE).

FIG. 2 illustrates a plot showing comparison of haze values of inventive examples (Haze IE) vs. comparative examples (Haze CE).

It was therefore an object of the present invention to eliminate the problems related to the prior art and to provide propylene homo- or copolymer compositions having an excellent balance between optical properties, mechanical properties, thermal properties and processing properties.

This object was achieved by a propylene homo- or copolymer composition comprising an in-situ reactor blend of a Ziegler-Natta catalysed, nucleated polypropylene (znPP) and a metallocene catalysed polypropylene (mcPP), in a weight ratio in the range of 6:94 to 50:50 (wt % znPP:wt % mcPP), preferably in the range of 10:90 to 44:56 (wt % znPP:wt % mcPP), said propylene homo- or copolymer composition is endowed with the following features:
a) a $MFR_2$ according to ISO 1133 (230° C., 2.16 kg) in the range of 0.01 to 500 g/10 min
b) a comonomer-content (determined with FTIR) in the range of 0.0 to 8.0 wt %
c) xylene cold solubles (XCS) determined at 23° C. according to ISO 6427 of less than 10.0 wt %
d) in case of propylene homopolymers with isotactic pentads (mmmm) measured by $^{13}$C-NMR higher than 90% e) a melting temperature $T_m$, measured by DSC between 135° C. to 170° C. and
f) a crystallisation temperature $T_c$ measured by DSC between 100° C. to 135° C.
g) in case of propylene copolymers with a randomness measured by FTIR higher than 95%.

Furthermore the propylene homo- or copolymer composition of the present invention is characterized by an excellent balance between optical properties, mechanical properties, thermal properties and processing properties, whereby the propylene homo- or copolymer composition have
a tensile modulus (E) measured according to ISO 527-2 in the range of 500 to 3000 MPa
a Charpy notched impact strength (NIS) determined according to ISO 179-1eA:2000 at 23° C. in the range of 0.3 to 55 kJ/m$^2$ and at 0° C. in the range of 0.3 to 10 kJ/m$^2$ and
haze values according to ASTM D 1003 (1 mm placque) in the range of 5 to 55%.

The propylene homo- or copolymer composition according to the present invention is an in-situ reactor blend of two different polypropylenes, i.e. an in-situ blend of a Ziegler-Natta catalysed, nucleated polypropylene (znPP) and a metallocene catalysed polypropylene (mcPP).

As used herein the term "in-situ reactor blend" is intended to mean a mixture of polymers produced in one or more polymerisation zones in the same polymerisation process/system without the need for post polymerisation blending (although the resultant copolymer can undergo post polymerisation blending, for example, to incorporate modifiers and additives).

This in-situ reactor blend according to the present invention has an excellent balance between optical properties, mechanical properties, thermal properties and processing properties.

The composition according to the invention can be:
a propylene homopolymer composition comprising an in-situ reactor blend of a znPP-homopolymer and a mcPP-homopolymer or
a propylene copolymer composition comprising an in-situ reactor blend of a znPP-copolymer and a mcPP-copolymer.

If the propylene composition according to the invention is a propylene copolymer blend, the composition can contain up to 8.0 wt %, preferably up to 7.0 wt %, more preferably up to 5.0 wt % and most preferably up to 4.0 wt % of ethylene or $C_4$-$C_{10}$-alpha olefin comonomer, like 1-butene, 1-pentene, 1-hexene, 1-heptene and 1-octene. Preferably the comonomers used in the propylene copolymer compositions are ethylene and/or 1-butene, more preferably ethylene is the only comonomer used. The amount of comonomer in the propylene copolymer composition thus ranges from 0.5 to 8.0 wt %, preferably 0.7 to 7.0 wt %, more preferably 1.0 to 5.0 wt % and most preferably 1.5 to 4.0 wt %.

In contrast the term "homopolymer" as used herein is intended to encompass polymers which consist essentially of repeat units deriving from one monomer. Homopolymers may, for example, comprise at least 99.8%, preferably at least 99.9%, by weight of repeat units deriving from the monomer.

The benefit of the present invention can be reached over a broad range of the molecular weight. Accordingly the $MFR_2$ according to ISO 1133 (230° C., 2.16 kg) of the propylene homo- or copolymer composition of the present invention can vary over a broad spectrum and can be in the range of 0.01 to 500 g/10 min, preferably in the range of 0.1 to 300 g/10 min and more preferably in the range of 0.2 to 150 g/10 min.

Thus, propylene homo- or copolymer compositions with an $MFR_2$ below 1.5 g/10 min; i.e. in the range of 0.01 to <1.5 g/10 min, being suitable for extrusion applications (pipe, sheet), or with an MFR in the range of 1.5 to <5 g/10 min, being suitable for thermoforming applications or with an MFR between 5 and 500 g/10 min, being suitable for injection moulding applications, film and fibre applications, fall under the scope of the present invention.

Moreover it is desired that the propylene homo- or copolymer composition of the present invention has a rather high melting temperature ($T_m$) and crystallisation temperature ($T_c$).

Accordingly it is appreciated that the propylene homo- or copolymer composition according to this invention has a melting temperature ($T_m$) measured with DSC of at least 135.0° C., preferably of at least 140.0° C. and more preferably of at least 145° C. Thus it is in particular appreciated that the melting temperature ($T_m$) measured with DSC of the propylene homo- or copolymer composition is in the range of 135 to 170° C., preferably in the range of 140 to 168° C.

Additionally the propylene homo- or copolymer composition has preferably a crystallisation temperature ($T_c$) measured with DSC of at least 100° C., more preferably of at least 110° C. Thus it is in particular appreciated that the crystallisation temperature ($T_c$) measured with DSC of the propylene homo- or copolymer composition is in the range of 100 to 135° C., more preferably in the range of 110 to 130° C.

The xylene cold soluble (XCS) fraction determined at 23° C. according to ISO 6427 is present in an amount of less than 10.0 wt %, preferably of less than 8.0 wt % and more preferably of less than 6.0 wt %.

The isotactic pentads (mmmm) of propylene homopolymers of the present invention measured by $^{13}$C-NMR are higher than 90%, preferably higher than 92%, more preferably higher than 94% and even more preferably higher than 95%.

The propylene copolymers according to this invention have a randomness measured by FTIR higher than 95%.

The tensile modulus (E) measured according to ISO 527-2 of the propylene homo- or copolymer composition according to this invention is in the range of 500 to 3000 MPa, preferably in the range of 800 to 2600 MPa and more preferably in the range of 900 to 2500 MPa.

The Charpy notched impact strength (NIS) determined according to ISO 179-1eA:2000 at 23° C. is in the range of 0.3 to 55 kJ/m$^2$, preferably in the range of 0.5 to 50 kJ/m$^2$ and more preferably in the range of 0.7 to 45 kJ/m$^2$.

At 0° C. the NIS determined according to ISO 179-1eA:2000 is in the range of 0.3 to 10 kJ/m$^2$, preferably in the range of 0.5 to 8.0 kJ/m$^2$ and more preferably in the range of 0.6 to 6.0 kJ/m$^2$.

The haze values according to ASTM D 1003 measured on 1 mm placques are in the range of 5 to 55%, preferably in the range of 10 to 50% and more preferably in the range of 15 to 45%.

The compositions of the present invention are in-situ reactor polymer blends produced with a catalyst mixture comprising a Ziegler-Natta catalyst system and a metallocene catalyst system.

The weight ratio of the ZN-catalysed PP and the metallocene-catalysed PP is in the range of 6:94 to 50:50 (wt % znPP:wt % mcPP), preferably in the range of 10:90 to 44:56 (wt % znPP:wt % mcPP).

Ad Ziegler-Natta-Catalysed, Nucleated Polypropylene (znPP):

This component is produced by the Ziegler-Natta catalyst system part of the catalyst mixture.

Such a Ziegler-Natta catalyst system comprises a s.c. procatalyst, a cocatalyst component and a compound acting as external donor.

The Ziegler-Natta procatalyst used according to the present invention is typically a stereospecific, high yield Ziegler-Natta procatalyst comprising as essential component a solid transition metal component. This type of procatalysts comprise, as described in detail below, in addition to the solid transition metal (like Ti) component a cocatalyst(s) as well as external donor(s) as stereoregulating agent.

The solid transition metal component preferably comprises a magnesium halide and a transition metal compound. These compounds may be supported on a particulate support, such as inorganic oxide, like silica or alumina, or, usually, the magnesium halide itself may form the solid support. Examples of such catalysts are disclosed, among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754 and WO 2004/029112.

It is also possible that solid catalysts are self supported, i.e. the catalysts are not supported on an external support, but are prepared via emulsion-solidification technology, as described for example in WO 03/000757, WO 03/000754 and WO 2004/029112.

In addition to the magnesium halide and transition metal compound the solid transition metal component usually also comprises an electron donor (internal electron donor). Suitable electron donors are, among others, esters of carboxylic acids, like phthalates, citraconates, and succinates. Also oxygen- or nitrogen-containing silicon compounds may be used. Examples of suitable compounds are shown in WO 92/19659, WO 92/19653, WO 92/19658, U.S. Pat. Nos. 4,347,160, 4,382,019, 4,435,550, 4,465,782, 4,473,660, 4,530,912 and 4,560,671.

Preferably the Ziegler-Natta procatalyst used for the present invention is a Ziegler-Natta procatalyst, which contains a trans-esterification product of a $C_1$-$C_4$-alcohol and a phthalic ester as internal donor.

Such preferred procatalyst used according to the invention is prepared by
  a) reacting a spray crystallized or emulsion solidified adduct of $MgCl_2$ and a $C_1$-$C_4$-alcohol with $TiCl_4$
  b) reacting the product of stage a) with a dialkylphthalate of formula (I)

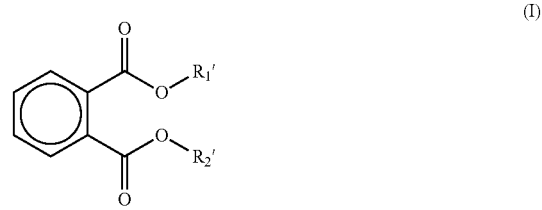

wherein $R_1'$ and $R_2'$ are independently at least a $C_5$-alkyl,
  under conditions where a transesterification between said $C_1$-$C_4$-alcohol and said dialkylphthalate of formula (I) takes place to form the internal donor,
  c) washing the product of stage b) and
  d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_4$-alcohol of the formula $MgCl_2*nROH$, wherein R is $C_1$-$C_4$-alkyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is $C_1$-$C_4$-alkyl, preferably ethyl and n is 1 to 6, is contacted with $TiCl_4$ to form a titanised carrier, followed by the steps of
  adding to said titanised carrier
    (i) a dialkylphthalate of formula (I) with $R_1'$ and $R_2'$ being independently at least a $C_5$-alkyl, like at least a $C_8$-alkyl,
    or preferably
    (ii) a dialkylphthalate of formula (I) with $R_1'$ and $R_2'$ being the same and being at least a $C_5$-alkyl, like at least a $C_8$-alkyl
    or more preferably
    (iii) a dialkylphthalate of formula (I) selected from the group consisting of propylhexylphthalate (PrHP), di(ethylhexyl)phthalate, di-iso-decylphthalate (DIDP), and ditridecylphthalate (DTDP), yet more preferably the dialkylphthalate of formula (IV) is di(ethylhexyl)phthalate (DOP) or di-iso-octylphtha-
late, in particular di(ethylhexyl)phthalate,
to form a first product,
subjecting said first product to suitable transesterification
conditions, i.e. to a temperature between 100 to 150°
C., such that said $C_1$-$C_4$-alcohol is transesterified with
said ester groups of said dialkylphthalate of formula (I)
to form preferably at least 80 mol-%, more preferably
at least 90 mol-%, most preferably at least 95 mol-%,
of a dialkylphthalate of formula (II)

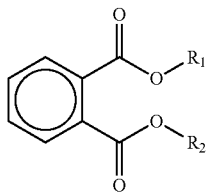

(II)

with $R_1$ and $R_2$ being $C_1$-$C_4$-alkyl, preferably ethyl,
the dialkylphthalate of formula (II) being the internal
donor and
recovering said transesterification product as the procata-
lyst composition.

The adduct of the formula $MgCl_2$*nROH, wherein R is
$C_1$-$C_4$-alkyl and n is 1 to 6, is in a preferred embodiment
melted and then the melt is preferably injected by a gas into
a cooled solvent or a cooled gas, whereby the adduct is
crystallized into a morphologically advantageous form, as
for example described in WO 87/07620.

This crystallized adduct is preferably used as the catalyst
carrier and reacted to the procatalyst useful in the present
invention as described in WO 92/19658 and WO 92/19653.

The transesterification is performed at a temperature
above 100° C., advantageously between 130 to 150° C.

As the catalyst residue is removed by extracting, an
adduct of the titanised carrier and the internal donor is
obtained, in which the group deriving from the ester alcohol
has changed.

In case a sufficient amount of titanium remains on the
carrier, it will act as an active element of the procatalyst.

Otherwise the titanisation is repeated after the above
treatment in order to ensure a sufficient titanium concentra-
tion and thus activity.

Preferably the procatalyst used according to the invention
contains 2.5% by weight of titanium at the most, preferably
2.2% by weight at the most and more preferably 2.0% by
weight at the most. Its donor content is preferably between
4.0 to 12.0% by weight and more preferably between 6.0 and
10.0% by weight.

More preferably the procatalyst used according to the
invention has been produced by using ethanol as the alcohol
and di(ethylhexyl)phthalate (DOP) as dialkylphthalate of
formula (I), yielding diethylphthalate (DEP) as the internal
donor compound.

Still more preferably the procatalyst used according to the
invention is a catalyst prepared according to WO92/19653;
especially with the use of di(ethylhexyl)phthalate as dialky-
lphthalate of formula (I) or alternatively a polypropylene
catalyst in the series of Polytrack, commercially available
from Grace.

As cocatalyst an organometallic compound are usually
used.

The organometallic compound is preferably an organo-
aluminium compound selected from the group consisting of
trialkylaluminium, like triethylaluminium (TEA), triisobu-
tylaluminium, tri-n-butylaluminium; dialkyl aluminium
chloride, like dimethyl- or diethyl aluminium chloride; and
alkyl aluminium sesquichloride. More preferably the cocata-
lyst is triethylaluminium or diethylaluminium chloride, most
preferably triethylaluminium is used as cocatalyst.

The catalysts system used comprises in addition an exter-
nal donor represented by formula (III) and/or (IV)

$$Si(OCH_2CH_3)_3(NR^3R^4) \quad \text{(III)}$$

$$R^5{}_nR^6{}_mSi(OR^7)_z \quad \text{(IV)}$$

wherein $R^3$ and $R^4$ can be the same or different and represent
a hydrocarbon group having 1 to 12 carbon atoms and $R^5$
and $R^6$ can be the same or different and represent a hydro-
carbon group having 1 to 12 carbon atoms, $R^7$ is methyl or
ethyl, z is 2 or 3, preferably 2, m is 0 or 1, n is 0 or 1, with
the proviso that n+m+z=4.

One suitable external donor is represented by formula
(III)

$$Si(OCH_2CH_3)_3(NR^3R^4)$$

wherein $R^3$ and $R^4$ can be the same or different and represent
a hydrocarbon group having 1 to 12 carbon atoms.

$R^3$ and $R^4$ are independently selected from the group
consisting of linear aliphatic hydrocarbon group having 1 to
12 carbon atoms, branched aliphatic hydrocarbon group
having 1 to 12 carbon atoms and cyclic aliphatic hydrocar-
bon group having 1 to 12 carbon atoms. It is in particular
preferred that $R^3$ and $R^4$ are independently selected from the
group consisting of methyl, ethyl, n-propyl, n-butyl, octyl,
decanyl, iso-propyl, iso-butyl, iso-pentyl, tert.-butyl, tert.-
amyl, neopentyl, cyclopentyl, cyclohexyl, methylcyclopen-
tyl and cycloheptyl. More preferably both $R^3$ and $R^4$ are the
same, yet more preferably both $R^3$ and $R^4$ are an ethyl group.

Most preferably diethylaminotriethoxysilane is used as
external donor of formula (III).

A further suitable external donor is represented by for-
mula (IV) $R^5{}_nR^6{}_mSi(OR^7)_z$, wherein $R^5$ and $R^6$ can be the
same or different and represent a hydrocarbon group having
1 to 12 carbon atoms, $R^7$ is methyl or ethyl, z is 2 or 3,
preferably 2, m is 0 or 1, n is 0 or 1, with the proviso that
n+m+z=4

Preferably $R^5$ and $R^6$ are independently selected from the
group consisting of linear aliphatic hydrocarbon group,
branched aliphatic hydrocarbon group, cyclic aliphatic
hydrocarbon group and aromatic group. It is in particular
preferred that $R^5$ and $R^6$ are independently selected from the
group consisting of methyl, ethyl, propyl, butyl, octyl,
decanyl, iso-propyl, iso-butyl, iso-pentyl, tert.-butyl, tert.-
amyl, neopentyl, cyclopentyl, cyclohexyl, methylcyclopen-
tyl and cycloheptyl.

Preferred examples are diisopropyldiethoxysilane (DIP-
DES), cyclohexylmethyldiethoxysilane (CHMDES), dicy-
clopentyldimethoxysilane (DCPDMS), cyclohexylmethyl-
dimethoxysilane (CHMDMS) and
dicyclopentadienyldiethoxysilane (DCPDES). More prefer-
ably an external donor of formula (IV) selected from cyclo-
hexylmethyl-dimethoxysilane, dicyclopentyldimethoxysi-
lane and di-iso-propyldiethoxysilane (DIPDES) is used and
most preferably the dicyclopentyldimethoxysilane is used as
external donor of formula (IV).

The nucleation of the Ziegler-Natta-catalysed propylene
homo- or copolymer is preferably carried out by modifica-
tion of the Ziegler-Natta catalyst with polymerised vinyl compounds of formula (V) CH$_2$=CH—CHR$^7$R$^8$, wherein R$^7$ and R$^8$ together form a 5- or 6-membered saturated, unsaturated or aromatic ring or independently represent an alkyl group comprising 1 to 4 carbon atoms.

Examples for suitable vinyl compounds are vinyl cycloalkanes, like vinyl cyclohexene (VCH), vinyl cyclopentane, vinyl-2-methyl cyclohexene and vinyl norbornane, 3-methyl-1-butene, styrene, p-methyl-styrene, 3-ethyl-1-hexene or mixtures thereof. VCH is preferably used for procatalyst modification A particularly preferred embodiment of the catalyst modification comprises the following steps:
 introducing a Ziegler-Natta procatalyst, as described above into the reaction medium,
 adding the cocatalyst and the external donor
 feeding a vinyl compound to the agitated reaction medium at a weight ratio of 0.1 to 20, preferably 0.1 to 10, vinyl compound/catalyst
 subjecting the vinyl compound to a polymerisation reaction in the presence of said procatalyst, cocatalyst and external donor at a temperature of 35 to 65° C. and
 continuing the polymerisation reaction until a maximum concentration of the unreacted vinyl compound of less than 2000, preferably less than 1000 ppm by weight, is obtained,
 yielding a modified Ziegler-Natta catalyst system containing up to 20 grams of vinyl compound per one gram of solid catalyst.

Preferably the modified Ziegler-Natta catalyst system contains 1 to 10 grams of vinyl compound per one gram of solid catalyst.

More preferred modified Ziegler-Natta catalyst systems contain 1, 2 or 5 grams of vinyl compound per one gram of solid catalyst.

The modification of the Ziegler-Natta procatalyst is carried out essentially before any contacting with the metallocene catalyst system and thus before any prepolymerisation of the catalyst mixture with the olefinic monomer, i.e. propylene.

Prepolymerisation here means a conventional, usually continuous process step performed prior to the main polymerisation step(s), wherein the catalyst, in case of the invention the catalyst mixture, is polymerised with propylene to a minimum degree of 10 g, preferably of at least 100 g polypropylene and more preferably of at least 500 g polypropylene per 1 g catalyst mixture.

By carrying out the modification of the Ziegler-Natta catalyst essentially before contacting it with the metallocene catalyst system and before contacting the mixture with propylene, it can be ensured that the polymerisation reaction of the vinyl compound is complete under the reaction conditions observed.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerisation reaction.

Furthermore this method is also known as Borealis Nucleation Technology (BNT).

Due to this advantageous way of Ziegler-Natta catalyst modification it is possible to perform the subsequent polymerisation steps without the addition of any additional external donor and additional cocatalyst to the prepolymerisation step and to any subsequent polymerisation step(s), like bulk polymerisation and/or gas phase polymerisation. Only the amount of external donor and cocatalyst used during the catalyst preparation of the nucleated Ziegler-Natta catalyst is used.

Ad Metallocene Catalysed Polypropylene (mcPP):

This component is produced by the metallocene catalyst system part of the catalyst mixture.

Such a metallocene catalyst system comprises a complex and an activator.

Such catalyst complexes comprise a transition metal compound which contains at least one cyclopentadienyl, indenyl or fluorenyl ligand. Preferably the catalyst complex contains two bridged cyclopentadienyl, indenyl or fluorenyl ligands. Further, the ligands may have substituents, such as alkyl groups, aryl groups, arylalkyl groups, alkylaryl groups, silyl groups, siloxy groups, alkoxy groups or other heteroatom groups. Examples of suitable metallocene compounds are given, among others, in EP 629631, EP 629632, WO 00/26266, WO 02/002576, WO 02/002575, WO 99/12943, WO 98/40331, EP 776913, EP 1074557 and WO 99/42497.

Metallocene catalysts are used together with an activator. Suitable activators are metal alkyl compounds and especially aluminium alkyl compounds known in the art. Especially suitable activators used with metallocene catalysts are alkylaluminium oxy-compounds, such as methylalumoxane (MAO), tetraisobutylalumoxane (TIBAO) or hexaisobutylalumoxane (HIBAO).

According to the present invention preferably metallocene catalysts of formula (VI)

$$R_n(Cp')_2MX_2 \qquad (VI)$$

wherein
"M" is zirconium (Zr) or hafnium (Hf), preferably zirconium (Zr),
each "X" is independently a monovalent anionic σ-ligand,
each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
"R" is a bivalent bridging group linking said organic ligands (Cp'), and
"n" is 1 or 2, preferably 1,
are used for preparing the mc-catalyzed polypropylene component.

A solid catalyst system comprising the metallocene of formula (VI) suitable for preparing the mc-catalyzed polypropylene component has a surface of lower than 15 m$^2$/g, preferably lower than 10 m$^2$/g and more preferably lower than 5 m$^2$/g, which is the lowest measurement limit. The surface area according to this invention is measured according to ASTM D 3663 (N$_2$).

Alternatively or additionally it is appreciated that said solid catalyst system has a porosity of less than 1.30 ml/g and more preferably less than 1.00 ml/g. The porosity has been measured according to ASTM 4641 (N$_2$). In another preferred embodiment the porosity is not detectable when determined with the method applied according to ASTM 4641 (N$_2$).

Furthermore said solid catalyst system typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 70 μm, or even 10 to 60 μm.

As stated above the transition metal (M) is zirconium (Zr) or hafnium (Hf), preferably zirconium (Zr).

The term "σ-ligand" is understood in the whole description in a known manner, i.e. a group bound to the metal via a sigma bond. Thus the anionic ligands "X" can independently be halogen or be selected from the group consisting of R', OR', SiR'$_3$, OSiR'$_3$, OSO$_2$CF$_3$, OCOR', SR', NR'$_2$ or PR'$_2$ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiment the anionic ligands "X" are identical and either halogen, like Cl, or methyl or benzyl.

A preferred monovalent anionic ligand is halogen, in particular chlorine (Cl).

The substituted cyclopentadienyl-type ligand(s) may have one or more substituent(s) being selected from the group consisting of halogen, hydrocarbyl (e.g. $C_1$ to $C_{20}$ alkyl, $C_2$ to $C_{20}$ alkenyl, $C_2$ to $C_{20}$ alkynyl, $C_3$ to $C_{20}$ cycloalkyl, like $C_1$ to $C_{20}$ alkyl substituted $C_5$ to $C_{20}$ cycloalkyl, $C_6$ to $C_{20}$ aryl, $C_5$ to $C_{20}$ cycloalkyl substituted $C_1$ to $C_{20}$ alkyl wherein the cycloalkyl residue is substituted by $C_1$ to $C_{20}$ alkyl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$-heteroaryl, $C_1$ to $C_{20}$-haloalkyl, —SiR''$_3$, —SR'', —PR''$_2$ or —NR''$_2$, each R'' is independently a hydrogen or hydrocarbyl (e.g. $C_1$ to $C_{20}$ alkyl, $C_1$ to $C_{20}$ alkenyl, $C_2$ to $C_{20}$ alkynyl, $C_3$ to $C_{12}$ cycloalkyl, or $C_6$ to $C_{20}$ aryl) or e.g. in case of —NR''$_2$, the two substituents R'' can form a ring, e.g. five- or six-membered ring, together with the nitrogen atom wherein they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as $C_1$ to $C_{20}$-hydrocarbyl, tri($C_1$ to $C_{20}$-alkyl)silyl, tri($C_1$ to $C_{20}$-alkyl)siloxy and more preferably "R" is a one atom bridge like e.g. —SiR'''$_2$—, wherein each R''' is independently $C_1$ to $C_{20}$-alkyl, $C_2$ to $C_{20}$-alkenyl, $C_2$ to $C_{20}$-alkynyl, $C_3$ to $C_{12}$ cycloalkyl, $C_6$ to $C_{20}$-aryl, alkylaryl or arylalkyl, or tri($C_1$ to $C_{20}$ alkyl)silyl-residue, such as trimethylsilyl-, or the two R''' can be part of a ring system including the Si bridging atom.

In a preferred embodiment the metallocene catalyst, i.e. the transition metal compound, has the formula (VII)

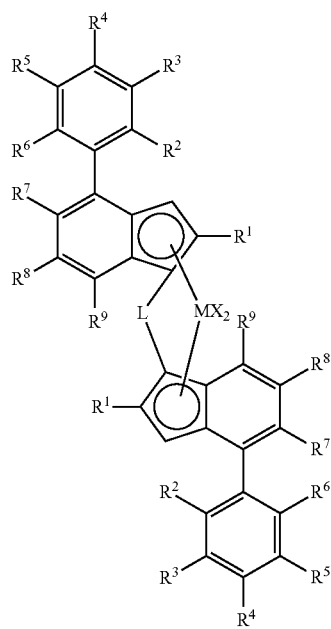

wherein

M is zirconium (Zr) or hafnium (Hf), preferably zirconium (Zr),

X are ligands with a σ-bond to the metal "M", preferably those as defined above for formula (I), preferably chlorine (Cl) or methyl (CH$_3$), the former especially preferred, $R^1$ are equal to or different from each other, preferably equal to, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), preferably are equal to or different from each other, preferably equal to, and are $C_1$ to $C_{10}$ linear or branched hydrocarbyl, more preferably are equal to or different from each other, preferably equal to, and are $C_1$ to $C_6$ linear or branched alkyl, $R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC), preferably are equal to or different from each other and are $C_1$ to $C_{10}$ linear or branched hydrocarbyl, more preferably are equal to or different from each other and are $C_1$ to $C_6$ linear or branched alkyl, $R^7$ and $R^8$ are equal to or different from each other and selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), SiR$^{10}$$_3$, GeR$^{10}$$_3$, OR$^{10}$, SR$^{10}$ and NR$^{10}$$_2$, wherein $R^{10}$ is selected from the group consisting of linear saturated $C_1$-$C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), and/or $R^7$ and $R^8$ being optionally part of a $C_4$ to $C_{20}$ carbon ring system together with the indenyl carbons to which they are attached, preferably a $C_5$ ring, optionally one carbon atom can be substituted by a nitrogen, sulfur or oxygen atom, $R^9$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, OR$^{10}$, and SR$^{10}$, preferably $R^9$ are equal to or different from each other and are H or CH$_3$, wherein $R^{19}$ is defined as before, L is a bivalent group bridging the two indenyl ligands, preferably being a $C_2R^{11}$$_4$ unit or a SiR$^{11}$$_2$ or GeR$^{11}$$_2$, wherein, $R^{11}$ is selected from the group consisting of H, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl or $C_7$ to $C_{20}$ arylalkyl, optionally containing one or more heteroatoms of groups 14 to 16 of the Periodic Table (IUPAC), preferably $Si(CH_3)_2$, $SiCH_3C_6H_{11}$, or $SiPh_2$, wherein $C_6H_{11}$ is cyclohexyl.

Preferably the transition metal compound of formula (VII) is $C_2$-symmetric or pseudo-$C_2$-symmetric. Concerning the definition of symmetry it is referred to Resconi et al. Chemical Reviews, 2000, Vol. 100, No. 4 1263 and references herein cited.

Preferably the residues $R^1$ are equal to or different from each other, more preferably equal, and are selected from the group consisting of linear saturated $C_1$ to $C_{10}$ alkyl, linear unsaturated $C_1$ to $C_{10}$ alkyl, branched saturated $C_1$ to $C_{10}$ alkyl, branched unsaturated $C_1$ to $C_{10}$ alkyl and $C_7$ to $C_{12}$ arylalkyl. Even more preferably the residues $R^1$ are equal to or different from each other, more preferably equal, and are selected from the group consisting of linear saturated $C_1$ to $C_6$ alkyl, linear unsaturated $C_1$ to $C_6$ alkyl, branched saturated $C_1$ to $C_6$ alkyl, branched unsaturated $C_1$ to $C_6$ alkyl and $C_7$ to $C_{10}$ arylalkyl. Yet more preferably the residues $R^1$ are equal to or different from each other, more preferably equal, and are selected from the group consisting of linear or branched $C_1$ to $C_4$ hydrocarbyl, such as for example methyl or ethyl.

Preferably the residues $R^2$ to $R^6$ are equal to or different from each other and linear saturated $C_1$ to $C_4$ alkyl or branched saturated $C_1$ to $C_4$ alkyl. Even more preferably the residues $R^2$ to $R^6$ are equal to or different from each other, more preferably equal, and are selected from the group consisting of methyl, ethyl, iso-propyl and tert-butyl.

Preferably $R^7$ and $R^8$ are equal to or different from each other and are selected from hydrogen and methyl, or they are part of a 5-methylene ring including the two indenyl ring carbons to which they are attached. In another preferred embodiment, $R^7$ is selected from $OCH_3$ and $OC_2H_5$, and $R^8$ is tert-butyl.

In a preferred embodiment the transition metal compound is rac-methyl(cyclohexyl)silanediyl bis(2-methyl-4-(4-tert-butylphenyl)indenyl)zirconium dichloride.

Preferably said solid catalyst system comprises additionally a cocatalyst comprising an element of group 13 of the periodic table (IUPAC), for instance the cocatalyst comprises a compound of Al.

Examples of such cocatalyst are organo aluminium compounds, such as aluminoxane compounds.

Such compounds of Al, preferably aluminoxanes, can be used as the only compound in the cocatalyst or together with other cocatalyst compound(s). Thus besides or in addition to the compounds of Al, i.e. the aluminoxanes, other cation complex forming cocatalyst compounds, like boron compounds can be used. Said cocatalysts are commercially available or can be prepared according to the prior art literature. Preferably however in the manufacture of the solid catalyst system only compounds of Al as cocatalyst are employed.

In particular preferred cocatalysts are the aluminoxanes, in particular the $C_1$ to $C_{10}$-alkylaluminoxanes, most particularly methylaluminoxane (MAO).

Preferably, the organo-zirconium compound of formula (VI) or (VII) and the cocatalyst of the solid catalyst system represent at least 70 wt %, more preferably at least 80 wt %, even more preferably at least 90 wt %, even further preferably at least 95 wt % of the solid catalyst system. Thus it is appreciated that the solid catalyst system is featured by the fact that it is self-supported, i.e. it does not comprise any catalytically inert support material, like for instance silica, alumina or $MgCl_2$ or porous polymeric material, which is otherwise commonly used in heterogeneous catalyst systems, i.e. the catalyst is not supported on external support or carrier material. As a consequence of that the solid catalyst system is self-supported and it has a rather low surface area.

In one embodiment the solid metallocene catalyst system is obtained by the emulsion/solidification technology, the basic principles of which are described for example in WO 03/051934 and WO2006/069733. These documents are herewith included in its entirety by reference.

Hence the solid catalyst system is preferably in the form of solid catalyst particles, obtainable by a process comprising the steps of a) preparing a solution (A) of one or more catalyst components in a solvent (A');
b) dispersing said solution (A) in a second solvent (B) to form an emulsion in which said one or more catalyst components are present in the droplets of the dispersed phase,
c) solidifying said dispersed phase to convert said droplets to solid particles and optionally recovering said particles to obtain said catalyst.

The term "solution" throughout the present application indicates that two or more substances are homogenous mixed. At least one of the substances is a solvent in which the other substances (the solutes) are dissolved. In the instant invention the solvent of the solution (A) is the solvent (A') as defined in more detail below, whereas the solutes of the solution (A) are at least the metallocene of formula (VII) and the cocatalyst.

An "emulsion" according to this invention is a mixture of two liquid substances. One substance (the dispersed phase) is dispersed in the other (the continuous phase) as droplets. In the present application the continuous phase is the solvent (B) and the dispersed phase (in the form of droplets) is the solution (A) containing the catalyst components.

The solvent (A') of the present invention is a solvent which dissolves the components of the catalyst system, i.e. at least the transition metal compound of formula (VII) and the cocatalyst. Preferably the solvent (A') is an organic solvent (A'). Still more preferably the organic solvent (A') is selected from the group consisting of a linear alkane, cyclic alkane, aromatic hydrocarbon (like toluene, benzene, ethylbenzene, propylbenzene, butylbenzene and/or xylene), and halogen-containing hydrocarbon. Toluene is in particular preferred as a solvent (A') to form the solution (A) with the components of the catalyst system.

The solvent (B) may a single solvent or a mixture of different solvents, wherein solution (A) forms the dispersed phase. The solvent (B) may be immiscible with the solution (A) at least at the conditions (e.g. temperatures) used during the dispersing step (b).

The term "immiscible with the solution (A)" means that the solvent (B) is fully immiscible or partly immiscible i.e. not fully miscible with the dispersed phase solution (A).

Preferably said solvent (B) is inert in relation to the compounds of the catalyst system to be produced. The term "inert in relation to the compounds" means herein that the solvent (B) of the continuous phase is chemically inert, i.e. undergoes no chemical reaction with any catalyst system forming compound or catalyst system precursor forming compound (e.g. the transition metal compound of formula (VII) and the cocatalyst). Thus, the solid particles of the catalyst system or any precursor thereof are formed in the droplets from the compounds which originate from the dispersed phase, i.e. are provided to the emulsion in the solution (A) dispersed into the continuous phase forming solvent (B).

It is preferred that the catalyst system compounds(s) used for forming the solid catalyst system (e.g. the transition metal compound of formula (VII) and the cocatalyst), are not soluble in the solvent (B). Preferably, said catalyst system compounds(s) (e.g. the metallocene of formula (VII) and the cocatalyst) are essentially insoluble in said continuous phase forming solvent (B). The solidified catalyst system is also insoluble into the mixture of (B) and (A').

Accordingly the immiscible solvent (B) preferably comprises a halogenated organic solvent, particularly a fluorinated organic solvent and/or a functionalized derivative thereof, still more preferably the immiscible solvent (B) comprises a semi-, highly- or perfluorinated hydrocarbon and/or a functionalized derivative thereof. As used throughout the present invention, the phrase "semi fluorinated" defines a compound in which fluorine atoms constitute at least a third but not more than one-half of the non-carbon substituents, preferably of the hydrogens, on the carbon atoms in the molecule. On the other hand the phrase "highly fluorinated" refers generally to a compound in which fluorine atoms constitute more than one-half but not all of the non-carbon substituents, preferably of the hydrogens, on the carbon atoms in the molecule. Perfluorinated hydrocarbons or perhalogenated hydrocarbons refer to those that have all of the non-carbon substituents, preferably all of the hydrogens, on carbon atoms replaced with fluorine, respectively. It is in particular preferred, that said immiscible solvent (B) comprises, i.e. consist of, a perfluorohydrocarbon or a functionalized derivative thereof, preferably $C_3$ to $C_{30}$ perfluoroalkanes, -alkenes or -cycloalkanes, more preferred $C_4$ to $C_{10}$ perfluoro-alkanes, -alkenes or -cycloalkanes, particularly preferred perfluorohexane, perfluoroheptane, perfluorooctane or perfluoro(methylcyclohexane), perfluoro (1,3-dimethylcyclohexane) or a mixture thereof.

The definition of semi-, highly- and perfluorinated hydrocarbon is equally applicable for semi-, highly- and perhaloginated hydrocarbons.

These (fluorinated) solvents (B) are chemically very inert and are very poor solvents for polar compounds such as for the solvent (A) and the catalyst system compounds(s) (e.g. the transition metal compound of formula (VII) and the cocatalyst). Accordingly the reactive compounds (e.g. the transition metal compound of formula (VII) and the cocatalyst) can be kept within the droplet phase so that no relevant reactions in the continuous phase occur, which would worsen the morphology of the solidified catalyst system particles.

Due to the above poor solvent properties of the solvent (B), the "droplet form" of the catalyst system compounds remains even if the solvent (A) used initially is removed during solidification e.g. by heating the system.

Furthermore it is preferred that the emulsion comprising said continuous phase and said dispersed phase is a bi- or multiphasic system as known in the art. An emulsifier may be used for forming and stabilising the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst.

The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_{1-n}$ (suitably $C_{4-30}$- or $C_{5-15}$) alcohol (e.g. highly fluorinated heptanol, octanol or nonanol), oxide (e.g. propenoxide) or acrylate ester which reacts e.g. with a cocatalyst component, such as aluminoxane to form the "actual" surfactant.

A further possible class of suitable surfactants comprises
(i) at least one compound (SP) of formula (VIII)
and/or
(ii) a reaction product (RP) of at least one compound (SP) of formula (VIII) and a compound (C) comprising an element (E) of group 13 of the periodic table (IUPAC), preferably a compound comprising Al.

The formula (VIII) is

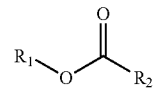

(VIII)

wherein
$R_1$ is a semi-, highly- or perhalogenated hydrocarbon residue, preferably is a semi-, highly- or perfluorinated hydrocarbon residue, and
$R_2$ is a residue of —$C(R_3)$=$C(R_{3'})$—$R_4$,
wherein
$R_3$, $R_4$, $R_{3'}$, are independently from each other selected from the group consisting of H, $C_1$ to $C_{20}$ alkyl, $C_2$ to $C_{20}$ alkenyl, $C_2$ to $C_{20}$ alkinyl, It is in particular preferred that the residue "$R_2$" of the compound (SP) of formula (VIII) is —$CR_3$=$CH_2$, wherein $R_3$ is selected from the group consisting of H, methyl, ethyl, n-propyl, iso-propyl, n-butyl, preferably H or methyl.

Thus in one embodiment the residue "$R_2$" of the compound (SP) of formula (VIII) is —$CH$=$CH_2$.

As stated above the residue "$R_1$" of the compound (SP) of formula (VIII) can be a halogenated, like fluorinated, hydrocarbon. Thus the residue "$R_1$" of the compound (SP) of formula (VIII) are based on halogenated, like fluorinated, hydrocarbons such as linear or branched aliphatic, alicyclic or aromatic halogenated, like fluorinated, hydrocarbons, such as a linear or cyclic halogenated, like fluorinated, alkyl or alkenyl. More preferably such hydrocarbons as defined in this paragraph are preferably semi-, highly- or perfluorinated hydrocarbons. It is in particular appreciated that the $R_1$ residue of the compound (SP) of formula (VIII) is either a highly- or perhalogenated hydrocarbon, like a highly- or perfluorinated hydrocarbon, such as linear or branched aliphatic, alicyclic or aromatic highly- or perhalogenated, like highly- or perfluorinated, hydrocarbons, such as a linear or cyclic highly- or perhalogenated, like highly- or perfluorinated, alkyl or alkenyl. Accordingly the residue "$R_1$" of compound (SP) of formula (VIII) is preferably a branched or linear highly- or perhalogenated, like highly- or perfluorinated, $C_3$ to $C_{30}$ alkyl, like a branched or linear highly- or perhalogenated, like highly- or perfluorinated, $C_6$ to $C_{30}$ alkyl. It is especially preferred that the residue "$R_1$" has the formula (IX)

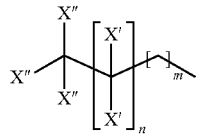
(IX)

wherein
X, X' are independently from each other $C_2$ to $C_{20}$ alkyl or halogen, preferably are independently from each other $C_2$ to $C_{20}$ n-alkyl or F, more preferably are F,
X" is halogen, more preferably is F,
n is 0 to 30, preferably 1 to 25, most preferably 5 to 20,
m is 0 to 10, more preferably 1 to 8, most preferably 2 to 5.

Accordingly in a preferred embodiment the residue "$R_1$" has the formula (IXa)

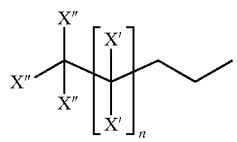
(IXa)

wherein
X is halogen, more is preferably F,
X' is $C_2$ to $C_{20}$ alkyl or halogen, preferably is $C_2$ to $C_{20}$ n-alkyl or F, more preferably is F,
X" is halogen, more preferably is F,
n is 0 to 30, preferably 1 to 25, most preferably 5 to 20.

In an especially preferred embodiment the residue "$R_1$" of compound (SP) of formula (VIII) has the formula (IXb)

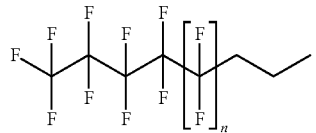
(IXb)

wherein
n is 5 to 30, more preferably 5 to 20.

Keeping the above information in mind the compound (SP) is preferably of formula (VIIIa)

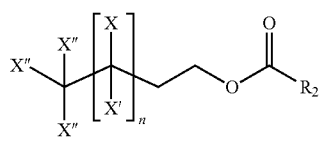
(VIIIa)

wherein
$R_2$ is a —$CR_3$=$CH_2$,
wherein
$R_3$ is selected from the group consisting of H, methyl, ethyl, n-propyl, iso-propyl, n-butyl, preferably H or methyl, X is F,
X' is $C_2$ to $C_{20}$ alkyl or halogen, preferably is $C_2$ to $C_{20}$ n-alkyl or F, more preferably is F,
X" is halogen, more preferably is F,
n is 0 to 30, preferably 1 to 25, most preferably 5 to 20.

Thus in one embodiment the residue $R_2$ of the compound (SP) of formula (VIIIa) is —CH=$CH_2$.

Therefore in one preferred embodiment the compound (SP) is preferably of formula (VIIIb)

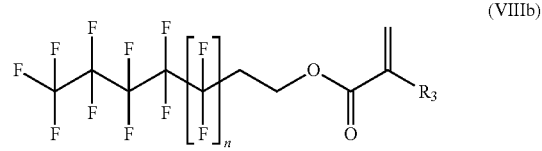
(VIIIb)

wherein
$R_3$ is selected from the group consisting of H, methyl, ethyl, n-propyl, iso-propyl, n-butyl, preferably is H or methyl, more preferably is H,
n is 0 to 30, preferably 1 to 25, most preferably 5 to 20.

As mentioned above the surfactant (S) is in one embodiment at least one compound (SP) as defined in more detail above. Accordingly it is preferred that the surfactant (S) comprises only compounds (SP) as defined above and no other compounds, i.e. surfactants and/or emulsifiers. Thus the surfactant (S) may only be one specific compound (SP) or a mixture of different compounds (SP) as defined above, the latter being preferred. Thus it is especially appreciated that the surfactant (S) is at least one compound (SP) of formula (VIIIa), more preferably is at least one compound (SP) of formula (VIIIb). In an especially preferred embodiment the surfactant (S) is a mixture of perfluoroalkylethyl acrylate esters (CAS number 65605-70-1).

In another preferred embodiment the surfactant (S) is a reaction product (RP) of at least one compound (SP) and the compound (C). Accordingly it is appreciated that the surfactant (S) is a reaction product (RP) of at least one compound of (SP) formula (VIII), more preferably of at least one compound (SP) of formula (VIIIa), still more preferably of at least one compound (SP) of formula (VIIIb), and a compound (C) comprising an element (E) of group 13 of the periodic table (IUPAC), preferably a compound comprising Al, like trialkylaluminium and/or aluminoxane, the latter especially preferred.

Further it is in particular appreciated that the compound (C) is the same compound as the cocatalyst.

Suitable processes for dispersing the solution (A) within the solvent (B) to form an emulsion is the use of a mechanical device as well as the use of ultrasound for mixing, as known to the skilled person. The process parameters, such as time of mixing, intensity of mixing, type of mixing, power employed for mixing, such as mixer velocity or wavelength of ultrasound employed, viscosity of solvent phase, are used for adjusting the size of the catalyst system.

Regardless of the method used to form the emulsion, its temperature prior to step (c) is preferably −20 to +50° C., more preferably −10 to +40° C., yet more preferably −5 to 30° C., and still more preferably 0 to 20° C. Suitable temperature is dependent on the solvents used.

In step (c) of the process of the invention the catalyst system is solidified from the droplets of the dispersed phase. According to the invention it is preferable to carry out this step continuously. During the solidification the solubility of the solvent of the dispersed phase used in emulsion formation in the continuous phase is increased. This change can be done e.g. by changing the temperature of the emulsion, by diluting the emulsion or by adding any other solubility changing agent into the emulsion or by any combinations of these methods. Other alternatives to affect solidification are prepolymerisation reaction within said dispersed phase, cross-linking (e.g. partially or fully) the catalyst within said dispersed phase by adding a cross-linking agent; and inducing a chemical reaction within the dispersed phase which causes solid catalyst particles to solidify. A preferred method is to use the temperature change method.

In said preferred embodiment solidification is affected by subjecting the emulsion to a temperature change. More preferably the emulsion is subjected to a temperature change e.g. >2° C./min, preferably >10° C./min, still more preferably >30° C./min, and still more preferably >30° C./s. The rate of the temperature change depends on whether more or less rapid temperature change is desired. According to one embodiment the temperature change is selected so that it is capable of causing instant solidification of the catalyst. By "instant solidification" is meant that solidification occurs within 0.01 to 5 seconds, preferably 0.05 to 1 second of exposure to the means by which the temperature change is to be affected. In one embodiment the emulsion is diluted by an additional amount of liquid medium before subjecting it to the solidification step. The appropriate temperature change in the emulsion required to achieve solidification will depend on the nature of the emulsion, any additional components present such as surfactants, the quantity of emulsion involved and/or the means by which the temperature change is affected. Typically, however, the temperature change required to bring about solidification of the catalyst system will be 5 to 100° C., preferably 10 to 80° C., more preferably 20 to 80° C., e.g. 40 to 70° C.

In a preferred embodiment the temperature change is obtained by exposing the emulsion to an environment having a different temperature. Preferably the environment to which the emulsion is exposed is hotter than the emulsion. Thus preferably the environment to which the emulsion is exposed has a temperature which is at least 10 to 150° C., preferably 20 to 120° C., more preferably 30 to 100° C., e.g. 50 to 80° C., such as about 70° C. higher than that of the emulsion. The temperature should, however, be below the boiling point of the solvents. As mentioned above, in a particularly preferred process the emulsion may be prepared at a low temperature and/or cooled to increase the temperature difference between the emulsion and the environment to which it is exposed.

In a particularly preferred process of the invention the environment having a different temperature comprises a liquid, in which the catalyst is substantially insoluble, whereby the heat is transferred via convection. During the solidification the emulsion is preferably contacted with a large surplus of said liquid, in order to achieve a fast convective heat transport and thus a fast heat up of the emulsion, which leads to effective extraction of the solvent of the catalyst phase (catalyst droplets) to the receiving liquid and thus to effective solidification. As a result, a solid catalyst dispersion/suspension is obtained. This dispersion is much more stable compared to the emulsion and is thus easy to handle in any further handling or transporting steps.

Particularly preferred mediums for use as the temperature changing liquid include those used as the continuous phase in step (b), i.e. the solvent (B), of the process hereinbefore described. Still more preferably the medium used as the temperature changing liquid is the same solvent used in step (b), i.e. the solvent (B). Preferred mediums therefore include perfluorohexane, perfluoroheptane, perfluoro(methylcyclohexane), perfluoro(1,3-dimethylcyclohexane) and perfluorooctane.

The solid catalyst particles which are obtained by the solification step may be separated and recovered by any procedure known in the art from the suspension. For example, the suspension may be filtered. Other commonly known methods for isolating are decanting, centrifuging and flotation. The catalyst system may then be optionally washed and/or dried to remove any solvent residuals present in the particles. The washing and/or drying of the catalyst particles may be carried out in any manner conventional in the art.

For further details, embodiments and examples of the continuous and dispersed phase system, emulsion formation method, emulsifying agent and solidification methods reference is made e.g. to the above cited international patent application WO 03/051934.

All or part of the preparation steps can be done in a continuous manner. Reference is made to WO 2006/069733 describing principles of such a continuous or semicontinuous preparation methods of the solid catalyst types, prepared via emulsion/solidification method.

The above described catalyst components are prepared according to the methods described in WO 01/48034.

For the preparation of the polypropylene compositions according to the present invention the above described Ziegler-Natta catalyst system (ZN) is mixed with the above described metallocene catalyst system (mc).

The weight ratio of the catalysts used is in the range of 5:95 to 40:60 (wt % ZN:wt % mc), preferably 8:92 to 35:65 (wt % ZN:wt % mc).

These two catalyst systems can be mixed together without disturbed catalyst chemistry or any kind of deactivation effect.

The mixing can be done either in a catalyst mixing tank in oil slurry or just before catalyst contact with propylene. In the second case both catalysts are fed simultaneously but separately, for example with separate feed pumps from separate feed tanks, to the first polymerisation step, which can be a prepolymerisation step or, if no prepolymerisation step is done, a bulk or gas phase polymerisation step.

The catalyst mixture can be used in a one or multi-stage polymerisation process for preparing the polypropylene compositions according to the present invention.

Any method for propylene polymerisation—for example, gas phase, bulk or slurry phase, solution polymerisation or any combination thereof—that is known for the polymerisation of propylene and optionally a comonomer in combination with the catalyst mixture, as described above, can be used.

Polymerisation can be a one stage or a two or multistage polymerisation process, carried out in at least one polymerisation reactor. For two or multistage processes different combinations can be used, e.g. gas-gas phase, slurry-slurry phase, slurry-gas phase processes; slurry-gas phase polymerisation being a preferred one. Any type of polymerisations as listed above are possible, however, slurry process being one preferred process for one stage processes.

In addition to the actual polymerisation the process configuration can comprise any pre- or post reactors.

Preferably the first step for producing the polypropylene compositions according to the present invention is a prepolymerisation step (a).

The prepolymerisation may be carried out in any type of continuously operating polymerisation reactor. Suitable reactors are continuous stirred tank reactors (CSTR), a loop reactor or a comparted reactor such as disclosed in WO 97/33920 or WO 00/21656 or a cascade of two or more reactors may be used.

Although the prepolymerisation may be carried out in a slurry polymerisation or a gas phase polymerisation, it is preferred to carry out the prepolymerisation as a slurry polymerisation, more preferably in a loop prepolymerisation reactor.

In a preferred embodiment, the prepolymerisation is conducted as bulk slurry polymerisation in liquid propylene, i.e. the liquid phase mainly comprises propylene, with minor amount of other reactants and optionally inert components dissolved therein.

The prepolymerisation is carried out in a continuously operating reactor at an average residence time of 5 minutes up to 90 min. Preferably the average residence time is within the range of 10 to 60 minutes and more preferably within the range of 15 to 45 minutes.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase and is generally selected such that the pressure is higher than or equal to the pressure in the subsequent polymerisation. Thus, the pressure may be from 20 to 100 bar, for example 30 to 70 bar.

In case a prepolymerisation step is performed, the all of the catalyst mixture is introduced to the prepolymerisation step.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or to the walls of the reactor.

A small amount of comonomer (ethylene and/or a $C_4$-$C_{10}$ alpha-olefin) may be introduced. The amount of comonomer is less than 5 weight % in order to avoid the occurrence of sticky particles which are caused by the reduced crystallinity of the prepolymer in the prepolymerised catalyst particles.

The reactants, catalyst mixture, propylene, comonomer, additives and the like, may be introduced in the prepolymerisation reaction or reactor continuously or intermittently. Continuous addition is preferred to improve process stability. The prepolymerised catalyst may be withdrawn from the prepolymerisation reaction or reactor either continuously or intermittently. Again a continuous withdrawal is preferred.

The precise control of the prepolymerisation conditions and reaction parameters is within the skill of the art.

The next step of the process for producing polypropylene compositions according to the present invention is preferably a slurry phase polymerisation step (b).

Slurry polymerisation is preferably a so called bulk polymerisation. By "bulk polymerisation" is meant a process where the polymerisation is conducted in a liquid monomer essentially in the absence of an inert diluent. However, as it is known to a person skilled in the art the monomers used in commercial production are never pure but always contain aliphatic hydrocarbons as impurities. For instance, the propylene monomer may contain up to 5% of propane as an impurity. As propylene is consumed in the reaction and also recycled from the reaction effluent back to the polymerisation, the inert components tend to accumulate, and thus the reaction medium may comprise up to 40 wt % of other compounds than monomer. It is to be understood, however, that such a polymerisation process is still within the meaning of "bulk polymerisation", as defined above.

The temperature in the slurry polymerisation is typically from 50 to 110° C., preferably from 60 to 100° C. and in particular from 65 to 95° C. The pressure is from 1 to 150 bar, preferably from 10 to 100 bar. In some cases it may be preferred to conduct the polymerisation at a temperature which is higher than the critical temperature of the fluid mixture constituting the reaction phase and at a pressure which is higher than the critical pressure of said fluid mixture. Such reaction conditions are often referred to as "supercritical conditions". The phrase "supercritical fluid" is used to denote a fluid or fluid mixture at a temperature and pressure exceeding the critical temperature and pressure of said fluid or fluid mixture.

The slurry polymerisation may be conducted in any known reactor used for slurry polymerisation. Such reactors include a continuous stirred tank reactor and a loop reactor. It is especially preferred to conduct the polymerisation in loop reactor. In such reactors the slurry is circulated with a high velocity along a closed pipe by using a circulation pump. Loop reactors are generally known in the art and examples are given, for instance, in U.S. Pat. Nos. 4,582,816 3,405,109, 3,324,093, EP-A-479186 and U.S. Pat. No. 5,391,654.

The residence time can vary in the reactor zones identified above. In one embodiment, the residence time in the slurry reactor, for example a loop reactor, is in the range of from 0.5 to 5 hours, for example 0.5 to 2 hours, while the residence time in the gas phase reactor generally will be from 1 to 8 hours.

The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

Into the slurry polymerisation stage other components may also be introduced as it is known in the art. Thus, hydrogen is added to control the molecular weight of the polymer. Process additives may also be introduced into the reactor to facilitate a stable operation of the process.

If the slurry polymerisation stage is followed by gas phase polymerisation stages it is preferred to conduct the slurry directly into the gas phase polymerisation zone without a flash step between the stages. This kind of direct feed is described in EP-A-887379, EP-A-887380, EP-A-887381 and EP-A-991684.

The reaction product of the slurry phase polymerisation, which preferably is carried out in a loop reactor, is then optionally transferred to a subsequent gas phase reactor.

Thus the optional third step of a process for producing polypropylene compositions according to the present invention is preferably a gas phase polymerisation step (c).

The polymerisation in gas phase may be conducted in fluidized bed reactors, in fast fluidized bed reactors or in settled bed reactors or in any combination of these. When a combination of reactors is used then the polymer is transferred from one polymerisation reactor to another. Furthermore, a part or whole of the polymer from a polymerisation stage may be returned into a prior polymerisation stage.

Ad Fluidized Bed:

In a fluidized bed gas phase reactor an olefin is polymerised in the presence of a polymerisation catalyst in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP 600414 and EP-A-721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas. The minimum fluidization velocity and the onset velocity of pneumatic transport can be calculated when the particle characteristics are know by using common engineering practise. An overview is given, among others in Geldart: Gas Fluidization Technology, J. Wiley & Sons, 1986.

When the fluidization gas is contacted with the bed containing the active catalyst mixture the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerisation.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

Typically the fluidized bed polymerisation reactor is operated at a temperature within the range of from 50 to 100° C., preferably from 65 to 90° C. The pressure is suitably from 10 to 40 bar, preferably from 15 to 30 bar.

Ad Fast Fluidized Bed:

The polymerisation may also be conducted in a fast fluidized bed reactor. In such a reactor the velocity of the fluidization gas exceeds the onset velocity of pneumatic transport. Then the whole bed is carried by the fluidization gas. The gas transports the polymer particles to a separation device, such as cyclone, where the gas is separated from the polymer particles. The polymer is transferred to a subsequent reaction zone, such as a settled bed or a fluidized bed or another fast fluidized bed reactor. The gas, on the other hand, is compressed, cooled and recycled to the bottom of the fast fluidized bed reactor. In one such embodiment the polymer is transferred from the riser (operated in fast fluidized mode) into the downcomer (operated as settled bed, as explained below) and the fluidizing gas is then directed to compression and cooling as described above. The combination of fast fluidized bed and settled bed is disclosed, among others, in WO-A-97/04015, WO-A-2006/022736 and WO-A-2006/120187.

Typically the fluidized bed polymerisation reactor is operated at a temperature within the range of from 50 to 100° C., preferably from 65 to 90° C. The pressure is suitably from 10 to 40 bar, preferably from 15 to 30 bar.

Ad Settled Bed:

Polymerisation may also be conducted in a settled bed. In the settled bed the polymer flows downward in a plug flow manner in an environment containing reactive components in gaseous phase. The polymer powder is introduced into the bed from the top from where it flows downwards due to gravity.

The reactants, such as hydrogen, monomer and comonomers, may be introduced at any point of the reactor. However, where the gas flows upwards its velocity should not exceed the minimum fluidization velocity as otherwise no downward flow of powder would be obtained. It is also preferred to have a gas buffer at the top of the reactor so that reaction gas from previous polymerisation zones contained in the polymer powder would be removed to the extent possible.

The temperature of the settled bed may be controlled by adjusting the temperature and ratio of the reactant and/or inert gases introduced into the settled bed zone.

The settled bed polymerisation zone is preferably combined with a fluidized bed polymerisation zone or fast fluidized bed reaction zone. Thus, the polymer is introduced into the top of the settled bed zone from a fluidized bed zone or a fast fluidized bed zone. The polymer is withdrawn from the bottom of the settled bed polymerisation zone and recycled into the fluidized bed polymerisation zone or fast fluidized bed polymerisation zone.

Polymerisation in settled bed is disclosed, among others, in EP-A-1633466, EP-A-1484343 and WO-A-97/04015.

Typically the settled bed polymerisation reactor is operated at a temperature within the range of from 50 to 100° C., preferably from 65 to 90° C. The pressure is suitably from 10 to 40 bar, preferably from 15 to 30 bar.

If desired, the polymerisation may be effected in a known manner under supercritical conditions in the slurry, preferably loop reactor, and/or as a condensed mode in the gas phase reactor.

Preferred multistage processes are slurry-gas phase processes, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315 incorporated herein by reference.

A further suitable slurry-gas phase process is the Spheripol® process of LyondellBasell.

Thus in a preferred embodiment, the present invention is also related to a process for preparing a propylene homo- or copolymer composition comprising an in-situ reactor blend of a Ziegler-Natta catalysed, nucleated polypropylene (znPP) and a metallocene catalysed polypropylene (mcPP), comprising the steps of (i) adding a catalyst mixture of a Ziegler-Natta catalyst system and a metallocene catalyst system in a weight ratio in the range of 5:95 to 40:60, preferably in the range of 8:92 to 35:75 to a prepolymerisation reactor, (ii) prepolymerising the catalyst mixture with propylene and optionally an ethylene and/or $C_4$-$C_{10}$ alpha-olefin, obtaining a prepolymerised product, (iii) transferring the prepolymerised product into a slurry reactor, (iv) further polymerising propylene and optionally an ethylene and/or $C_4$-$C_{10}$ alpha-olefin comonomer in the presence of prepolymerised product, (v) optionally transferring the slurry reactor product into a gas phase reactor (vi) optionally further polymerising propylene and optionally an ethylene and/or $C_4$-$C_{10}$ alpha-olefin comonomer in the presence of said slurry reactor product and (vii) recovering the so produced propylene homo- or copolymer after step (iv) or (vi) for further processing, whereby the catalyst mixture used comprises (a) 5 to 40 wt % of a Ziegler-Natta catalyst system comprising
- ($a_1$) a Ziegler-Natta procatalyst
- ($a_2$) a cocatalyst and
- ($a_3$) an external donor, the Ziegler-Natta catalyst system being modified with a vinyl compound of formula (V) $CH_2=CH-CHR^7R^8$, wherein $R^7$ and $R^8$ together form a 5- or 6-membered saturated, unsaturated or aromatic ring or independently represent an alkyl group comprising 1 to 4 carbon atoms and (b) 95 to 60 wt % of a metallocene catalyst system comprising
- ($b_1$) a metallocene compound of formula (VI)

$$R_n(Cp')_2MX_2 \qquad (VI)$$

wherein

"M" is zirconium (Zr) or hafnium (Hf), preferably zirconium (Zr), each "X" is independently a monovalent anionic σ-ligand, each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M), "R" is a bivalent bridging group linking said organic ligands (Cp'), and "n" is 1 or 2, preferably 1 and ($b_2$) a cocatalyst.

Furthermore the invention is related to the use of a catalyst mixture comprising (a) 5 to 40 wt % of a Ziegler-Natta catalyst system comprising
- ($a_1$) a Ziegler-Natta procatalyst
- ($a_2$) a cocatalyst and
- ($a_3$) an external donor, the Ziegler-Natta catalyst system being modified with a vinyl compound of formula (V) $CH_2=CH-CHR^7R^8$, wherein $R^7$ and $R^8$ together form a 5- or 6-membered saturated, unsaturated or aromatic ring or independently represent an alkyl group comprising 1 to 4 carbon atoms and (b) 95 to 60 wt % of a metallocene catalyst system comprising
- ($b_1$) a metallocene compound of formula (VI)

$$R_n(Cp')_2MX_2 \qquad (VI)$$

wherein

"M" is zirconium (Zr) or hafnium (Hf), preferably zirconium (Zr), each "X" is independently a monovalent anionic σ-ligand, each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M), "R" is a bivalent bridging group linking said organic ligands (Cp'), and "n" is 1 or 2, preferably 1 and (b$_2$) a cocatalyst, for the production of a propylene homo- or copolymer composition being an in-situ reactor blend of a Ziegler-Natta catalysed, nucleated polypropylene (znPP) and a metallocene catalysed polypropylene (mcPP), said propylene homo- or copolymer composition being endowed with the following features:

a) a MFR$_2$ according to ISO 1133 (230° C., 2.16 kg) in the range of 0.01 to 500 g/10 min b) a comonomer-content (determined with FTIR) in the range of 0.0 to 8.0 wt % c) xylene cold solubles (XCS) determined at 23° C. according to ISO 6427 of less than 10.0 wt % d) in case of propylene homopolymers with isotactic pentads (mmmm) measured by $^{13}$C-NMR higher than 90% e) a melting temperature T$_m$ measured by DSC between 135° C. to 170° C. and f) a crystallisation temperature T$_c$ measured by DSC between 100° C. to 135° C.

g) in case of propylene copolymers with a randomness measured by FTIR higher than 95%.

Surprisingly, the polypropylene compositions according to the present invention show an excellent balance of flowability, stiffness and haze compared to physical blends of metallocene catalysed polypropylenes and Ziegler-Natta catalysed polypropylenes or of metallocene catalysed polypropylenes and Ziegler-Natta catalysed polypropylenes alone.

EXPERIMENTAL PART

1. Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}$C{$^1$H} NMR spectra were recorded in the solution-state using a Bruker Advance III 400 NMR spectrometer operating at 400.15 and 100.62 MHz for $^1$H and $^{12}$C respectively. All spectra were recorded using a $^{13}$C optimised 10 mm extended temperature probehead at 125° C. using nitrogen gas for all pneumatics.

For polypropylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromoleucles 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellec-chia, R., Severn, J., Talarico, G., Macromol. Rapid Commun. 2007, 28, 11289). A total of 8192 (8 k) transients were acquired per spectra For ethylene-propylene copolymers approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6 k) transients were acquired per spectra.

Quantitative $^{13}$C{$^1$H} NMR spectra were processed, integrated and relevant quantitative properties determined from the integrals using proprietary computer programs. For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251). Specifically the influence of regio defects and comonomer on the quantification of the tacticity distribution was corrected for by subtraction of representative regio defect and comonomer integrals from the specific integral regions of the stereo sequences. The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$P_{21e} = (I_{e6} + I_{e8})/2$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio defects:

$$P_{total}=P_{12}+P_{21e}$$

The mole percent of 2,1 erythro regio defects was quantified with respect to all propene:

$$[21e]\text{mol \%}=100*(P_{21e}/P_{total})$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al. (Wang, W-J., Zhu, S., Macromolecules 33 (2000), 1157) through integration of multiple signals across the whole spectral region of a $^{13}C\{^1H\}$ spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

$$E[\text{mol \%}]=100*fE$$

The weight percent comonomer incorporation in the polymer was calculated from the mole fraction according to:

$$E[\text{wt \%}]=100*(fE*28.05)/((fE*28.05)+((1-fE)*42.08))$$

The comonomer sequence distribution at the triad level was determined using the method of Kakugo et al. (Kakugo, M., Naito, Y., Mizunuma, K., Miyatake, T. Macromolecules 15 (1982) 1150) through integration of multiple signals across the whole spectral region of a $^{13}C\{^1H\}$ spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. (Kakugo, M., Naito, Y., Mizunuma, K., Miyatake, T. Macromolecules 15 (1982) 1150) according to:

$$XXX[\text{mol \%}]=100*fXXX$$

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 201):

$$fXEX=fEEE+fPEE+fPEP$$

$$fXPX=fPPP+fEPP+fEPE$$

where PEE and EPP represents the sum of the reversible sequences PEE/EEP and EPP/PPE respectively.

Comonomer Content

The comonomer contents of the copolymer was determined by quantitative Fourier transform infrared spectroscopy (FTIR) calibrated to results obtained from quantitative $^{13}C$ NMR spectroscopy.

When measuring the ethylene content in polypropylene, a thin film of the sample (thickness about 250 mm) was prepared by hot-pressing. The area of —$CH_2$— absorption peak (800-650 $cm^{-1}$) was measured with Perkin Elmer FTIR 1600 spectrometer. The method was calibrated by ethylene content data measured by $^{13}C$-NMR.

The comonomer content C was determined using a film thickness method using the intensity of the quantitative band I(q) and the thickness of the pressed film T using the following relationship: $[I(q)/T]m+c=C$ where m and c are the coefficients determined from the calibration curve constructed using the comonomer contents obtained from $^{13}C$ NMR spectroscopy.

Randomness

In the FTIR measurements, films of 250 microns thickness were compression moulded at 225° C. and investigated on a Perkin-Elmer System 2000 FTIR instrument. The ethylene peak area (760-700 $cm^{-1}$) was used as a measure of total ethylene content. The absorption band for the structure —P-E-P— (one ethylene unit between propylene units), occurs at 733 $cm^{-1}$. This band characterizes the random ethylene content. For longer ethylene sequences (more than two units), an absorption band occurs at 720 $cm^{-1}$. Generally, a shoulder corresponding to longer ethylene runs is observed for the random copolymers. The calibration for total ethylene content based on the area and random ethylene (PEP) content based on peak height at 733 $cm^{-1}$ was made by $^{13}C$-NMR. (Thermochimica Acta, 66 (1990) 53-68). Randomness=random ethylene(—P-E-P—) content/the total ethylene content×100%.

Melt Flow Rates $MFR_2$

The melt flow rates were measured with a load of 2.16 kg ($MFR_2$) at 230° C. The melt flow rate is that quantity of polymer in grams which the test apparatus standardized to ISO 1133 extrudes within 10 minutes at a temperature of 230° C. under a load of 2.16 kg.

Xylene Cold Soluble Fraction (XCS wt %)

The xylene cold soluble fraction (XCS) is determined at 23° C. according to ISO 6427.

Melting temperature ($T_m$), crystallization temperature ($T_c$): according to ISO SO 11357-3:1999 was measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Porosity: BET with $N_2$ gas, ASTM 4641, apparatus Micromeritics Tristar 3000; sample preparation: at a temperature of 50° C., 6 hours in vacuum.

Surface area: BET with $N_2$ gas ASTM D 3663, apparatus Micromeritics Tristar 3000: sample preparation at a temperature of 50° C., 6 hours in vacuum.

Mean particle size is measured with Coulter Counter LS200 at room temperature with n-heptane as medium; particle sizes below 100 nm by transmission electron microscopy Median particle size ($d_{50}$) is measured with Coulter Counter LS200 at room temperature with n-heptane as medium Charpy Notched Impact Strength (NIS)

NIS was determined according to ISO 179-1eA:2000 on V-notched samples of 80×10×4 mm$^3$ at 23° C. and 0° C. (Charpy notched impact strength (23° C., respectively 0° C.)). The test specimens were prepared by injection moulding using an IM V 60 TECH machinery in line with EN ISO 1873-2; (80*10×4 mm$^3$). The melt temperature was 200° C. and the mould temperature was 40° C.

Haze

Haze as measures for the optical appearance was determined according to ASTM D 1003-92 (haze), on injection moulded plaques with a thickness of 1 mm.

Tensile Modulus is measured according to ISO 527-2 (cross head speed=1 mm/min; 23° C.) using injection moulded specimens as described in EN ISO 1873-2 (dog bone shape, 4 mm thickness).

2. Examples

Catalysts Used a) ZN-catalyst:
  $a_1$) unmodified Ziegler-Natta catalyst; no VCH The catalyst $a_1$) used in the polymerisation process was a 1.9 wt % Ti-Ziegler-Natta-catalyst prepared according to WO 92/19653 with DOP as dialkylphthalat of the formula (I) and ethanol as alcohol, with triethyl-aluminium (TEA) as co-catalyst and dicyclopentyldimethoxysilane (donor; DCPDMS) as external donor.

$a_2$) modified Ziegler-Natta catalyst (VCH/Cat=1)
  An unmodified Ziegler-Natta catalyst was prepared as described for $a_1$).

Then the solid catalyst component was suspended in Drakeol 35 oil, supplied by Penreco, to produce a catalyst slurry containing 22.6% by weight solids.

Triethylaluminium and dicyclopentyldimethoxysilane (DCPDMS) were then added to the slurry so that the molar ratio Al/Ti was 1.4 mol/mol and the molar ratio of triethylaluminium to DCPDMS was 7 mol/mol. Then, vinylcyclohexane was added to the slurry in such an amount that the weight ratio of the vinylcyclohexane to the solid catalyst component was 1/1. The mixture was agitated and allowed to react until the content of the unreacted vinylcyclohexane in the reaction mixture was about 1000 ppm. The thus modified catalyst was then filtered and mixed with fresh Drakeol 35 to reach a catalyst concentration of 22 wt %, calculated as solid transition metal component in oil.

$a_3$) modified Ziegler-Natta catalyst (VCH/Cat=2)
  The catalyst was prepared as described for $a_2$) with the exceptions that vinylcyclohexane was added to the slurry in such an amount that the weight ratio of the vinylcyclohexane to the solid catalyst component was 2/1.

$a_4$) modified Ziegler-Natta catalyst (VCH/Cat=5)
  The catalyst was prepared as described for $a_2$) with the exceptions that vinylcyclohexane was added to the slurry in such an amount that the weight ratio of the vinylcyclohexane to the solid catalyst component was 5/1.

$a_5$) modified Ziegler-Natta catalyst (VCH/Cat=10)
  The catalyst was prepared as described for $a_2$) with the exceptions that vinylcyclohexane was added to the slurry in such an amount that the weight ratio of the vinylcyclohexane to the solid catalyst component was 10/1.

b) mc-catalyst:
  $b_1$) The catalyst was prepared according to example 5 of WO 03/051934 wherein the catalyst used therein was replaced by rac-methyl(cyclohexyl)silanediyl bis(2-methyl-4-(4-tert-butylphenyl)indenyl)zirconium dichloride. Rac-methyl(cyclohexyl)silanediyl bis(2-methyl-4-(4-tert-butylphenyl)indenyl)zirconium dichloride was prepared according to WO 2005 105863 A2, examples 17-18 and was used with methylaluminoxane (MAO) as cocatalyst.

Porosity and surface area below the detection limit.
  mol ratio Co/M (Al/Zr): 260 mol/mol
  Mean particle size: 26 μm
  Zr content: 0.53 wt-%
  Al content: 34.5 wt-%

$b_2$) The catalyst system was prepared as described for $b_1$) with a subsequent prepolymerisation step for prepolymerising the catalyst.

INVENTIVE EXAMPLES IE1 to IE5 and COMPARATIVE EXAMPLES CE1 to CE6

IE1 to IE5

The inventive homo- and random-PPs were prepared in a Büchi 5 L stainless steel autoclave reactor equipped with a paddle stirrer and a continuous supply of propylene. An appropriate amount (100 mg) of the catalyst mixture was charged to a feeding vessel in glove box after which the feeding vessel is transferred to the reactor. After the catalyst hydrogen was added in the reactor, 800-1400 g liquid propylene were fed and a pre-polymerisation was carried out at 23° C. for 6-8 min. Stirring was started and the temperature was increased to a set point temperature of 72° C., cf. data table 1. The polymerization was conducted for 60-80 min whereas propylene and/or propylene/ethylene mixture was continuously fed to maintain the right polymer composition. The total pressure in the reactor was ~38 bars. At the end of the polymerisation, the reactor was vented. The polymer was first dried overnight in a fume-hood and then put into a vacuum oven for 2 hours at 60° C.

The catalyst mixture was obtained by mixing ZN-catalyst $a_2$) and mc-catalyst $b_2$) into oil (Mineral oil; Primol 352) with two different mass dosing ratios 10/90 and 30/70 for ZN-catalyst and mc-catalyst so that the catalyst mixture content in the oil was 1.0 wt %.

All of the propylene monomer and hydrogen used to control the final MFR were added simultaneously in the prepolymerisation step.

Table 1 shows the reaction conditions and Table 2 shows the properties of three random and two homo-PPs produced with these conditions.

TABLE 1

| Reaction parameters | | | | | |
|---|---|---|---|---|---|
| | IE1 | IE2 | IE3 | IE4 | IE5 |
| ZN/mc Catalyst [wt %/wt %] | 10/90 | 30/70 | 30/70 | 30/70 | 30/70 |
| Prepolymerisation | | | | | |
| Temperature [° C.] | 23 | 23 | 23 | 23 | 23 |
| H$_2$/C$_3$ [mol/kmol] | 12.4 | 29.2 | 16.0 | 16.4 | 2.3 |
| Catalyst activity [kg Polymer/g cat.] | 4.95 | 9.26 | 14.5 | 8.46 | 10.24 |
| Polymerisation | | | | | |
| Temperature [° C.] | 72 | 72 | 72 | 72 | 72 |
| Residence time [h] | 1.0 | 1.0 | 1.0 | 1.0 | |
| C$_2$/C$_3$ [mol/kmol] | 0 | 0 | 14.0 | 15.4 | 13.8 |

TABLE 2

Properties

|  | IE1 | IE2 | IE3 | IE4 | IE5 |
|---|---|---|---|---|---|
| $C_2$-content wt % | 0 | 0 | 1.5 | 2.4 | 1.8 |
| mmmm [%] | 95.6 | 94.9 | n.a. | n.a. | n.a. |
| randomness [%] | n.a | n.a | 100 | 100 | 99.2 |
| $MFR_2$ | 142 | 21 | 31 | 97 | 5.75 |
| Tm [° C.] | 160 | 165 | 158 | 154 | 155 |
| Tc [° C.] | 125 | 128 | 124 | 122 | 122 |
| NIS @23° C. [kJ/m$^2$] | 0.8 | 0.8 | 1.36 | 0.92 | 5.31 |
| NIS @0° C. [kJ/m$^2$] | 0.7 | 0.7 | 0.82 | 0.81 | 0.9 |
| E [MPa] | 2230 | 2348 | 1874 | 1720 | 1593 |
| Haze % @ 1 mm | 37.4 | 43.7 | 35.6 | 40.5 | 25.4 |

CE1 to CE6

As Comparative Examples two random PPs produced only with mc-catalyst $b_2$) (CE1 and CE2), one physical blend containing 2 wt % of a ZN-$a_5$)—PP(CE3) and one ZN-$a_5$) homo-PP (CE4) were produced.

The polymers of CE1, CE2, CE3-mc, CE3-ZN and CE4 have been produced in a Borstar PP pilot plant in a two-step polymerisation process starting in prepolymerisation reactor, followed by a bulk-phase loop reactor and subsequently by polymerisation in a gas phase reactor, varying the molecular weight as well as ethylene content by appropriate hydrogen and comonomer feeds.

Further, as CE5 and CE6, two commercial polypropylene grades were used.

CE5: HK060AE of Borealis, a non-nucleated propylene homopolymer produced with a Ziegler-Natta catalyst CE6: HG385MO of Borealis, a nucleated propylene homopolymer produced with a Ziegler-Natta catalyst Table 3 shows the reaction conditions and Table 4 shows the properties of the comparative PPs

TABLE 3

Reaction parameters

|  | CE1 | CE2 | CE3-mc | CE3-ZN | CE4 |
|---|---|---|---|---|---|
| ZN/mc Catalyst wt % Prepolymerisation | 0/100 | 0/100 | 0/100 | 100/0 | 100/0 |
| Temperature [° C.] | 35 | 35 | 30 | 20 | 20 |
| Pressure [kPa] | 5523 | 5513 | 5265 | 5662 | 5662 |
| Residence time [h] | 0.43 | 0.43 | 0.33 | 0.32 | 0.32 |
| Catalyst feed [g/h] | 2.61 | 3.35 | 1.58 | 2.56 | 2.56 |
| Loop Polymerisation |  |  |  |  |  |
| Temperature [° C.] | 70 | 70 | 70 | 80 | 80 |
| Split [%] | 50.4 | 56.8 | 42.1 | 49.3 | 49.3 |
| Pressure [kPa] | 5260 | 5254 | 5403 | 5447 | 5447 |
| Residence time [h] | 0.51 | 0.46 | 0.57 | 0.5 | 0.5 |
| $C_2/C_3$ [mol/kmol] | 10.1 | 18.9 | 0 | 0 | 0 |
| $C_2$-content [wt %] | 0.68 | 2.36 | 0 | 0 | 0 |
| $MFR_2$ [g/10 min] | 7.6 | 5.95 | 8.6 | 0.61 | 0.61 |
| XS [wt %] | 1.4 | 1.8 | 0.9 | 1.1 | 1.1 |
| GPR1 |  |  |  |  |  |
| Temperature [° C.] | 85 | 85 | 85 | 95 | 95 |
| Pressure [kPa] | 3200 | 3200 | 3000 | 3300 | 3300 |
| Residence time [h] | 3.4 | 4.4 | 3.3 | 3.1 | 3.1 |
| Split [%] | 49.6 | 43.2 | 57.9 | 50.7 | 50.7 |
| $C_2/C_3$ [mol/kmol] | 44.1 | 118.8 | 0 | 0 | 0 |
| $C_2$-content [wt %] | 0.62 | 2.66 | 0 | 0 | 0 |
| $MFR_2$ [g/10 min] | 10.4 | 7.2 | 10.8 | 6.1 | 6.1 |
| XS [wt %] | 1.3 | 1.6 | 1.0 | 1.4 | 1.4 |

The polymer powders obtained for CE3-mc and CE3-ZN were physically dry blended in a weight ratio of 98/2 for CE3-mc/CE3-ZN and extruded using a PRISM TSE 24 twin screw extruder with an L/D ratio of 30:1 and two sets of kneading blocks in the screw configuration, using a melt temperature profile between 200 and 240° C.

TABLE 4

Properties

|  | CE1 | CE2 | CE3 | CE4 | CE5 | CE6 |
|---|---|---|---|---|---|---|
| $C_2$-content wt % | 0.83 | 3.0 | 0 | 0 | 0 | 0 |
| mmmm [%] | n.a. | n.a. | 99% | 98% | 97.7% | 98% |
| Randomness [%] | 97.3 | 90 | n.a. | n.a. | n.a. | n.a. |
| $MFR_2$ | 9.7 | 5.9 | 11 | 4.0 | 125 | 25 |
| Tm [° C.] | 146 | 135 | 154 | 167 | 167 | 167 |
| Tc [° C.] | 106 | 98 | 122 | 132 | 113 | 128 |
| NIS @23° C. [kJ/m$^2$] | 2.4 | 7.2 | 1.7 | 2.7 | 1.0 | 3.5 |
| NIS @0° C. [kJ/m$^2$] | 1.5 | 1.8 | 1.0 | 1.3 | 1.0 | 1.2 |
| E [MPa] | 1210 | 858 | 1700 | 2150 | 1550 | 1750 |
| Haze % @ 1 mm | 42 | 62 | 43 | 23 | 80 | 60 |

From the table it can be seen that the IEs are superior in terms of stiffness/$MFR_2$ balance, compared to physical blends (CE3), mc-PPs (CE1 and CE2) and ZN-PPs (CE4) with similar features.

Furthermore it can be seen that the homo-PPs of IE1 and IE2 have relatively lower haze at higher MFRs (35-40%) compared to the physical blend of CE3.

Both random-PPs of IE3 and IE4 have lower haze values at higher MFRs (37-44% compared to 42-62%) compared to CE1 and CE2.

Thus the IEs have an improved haze/$MFR_2$ balance.

In addition, clearly both random-PPs (IE3 and IE4) and both homo-PPs (IE1 and IE2) offer better properties in terms of balance of the three properties (i.e. MFR, stiffness and haze) compared to CE1 to CE4.

The homo-PP of IE1 thereby had the most advantageous balance of properties. It can be also seen that CE3, which offered good haze values was inferior to the IEs in terms of MFR/stiffness/Haze balance.

INVENTIVE EXAMPLES IE6 to IE8 and COMPARATIVE EXAMPLE CE7 and CE8

3 random-PPs were produced in a Borstar® Pilot Plant comprising a prepolymerisation reactor, a loop reactor and a gas phase reactor connected in series using a mixture of ZN-catalyst $a_4$) and mc-catalyst $b_1$). As comparative example CE7 a random PP was produced using ZN-catalyst $a_1$), triethylaluminium as cocatalyst and Dicyclopentyldimethoxysilane and one random PP (CE8) was produced using mc-catalyst $b_2$) with MAO cocatalyst.

In all cases hydrogen was fed in an amount necessary to reach the targeted MFR values.

The two catalysts were mixed into oil (Mineral oil; Primol 352) in the catalyst feed tank so that the catalyst content in the oil was 1.0 wt-%. Said mixture of catalyst and oil was fed continuously by pump into the polymerisation process.

TABLE 5

Reaction parameters

|  | IE6 | IE7 | IE8 | CE7 | CE8 |
|---|---|---|---|---|---|
| ZN/mc Catalyst wt %/wt % | 10/90 | 10/90 | 10/90 | 100/0 | 0/100 |
| Prepolymerisation | | | | | |
| Temperature [° C.] | 30 | 30 | 30 | 30 | 30 |
| Pressure [kPa] | 5137 | 5145 | 5162 | 5092 | 5157 |
| Residence time [h] | 0.36 | 0.36 | 0.36 | 0.35 | 0.48 |
| Catalyst feed [g/h] | 4.94 | 5.19 | 4.15 | 1.6 | 3.25 |
| Loop-Polymerisation | | | | | |
| Temperature [° C.] | 70 | 70 | 70 | 68 | 65 |
| Pressure [kPa] | 5281 | 5286 | 5305 | 5242 | 5320 |
| Residence time | 0.31 | 0.30 | 0.36 | 0.48 | 0.30 |
| $C_2/C_3$ [mol/kmol] | 3.9 | 4.3 | 4.2 | 9.5 | 4.5 |
| $C_2$-content | 0.79 | 0.71 | 0.48 | 4.00 | 0.26 |
| Split [%] | 46 | 48 | 52 | 52 | 50.5 |
| $MFR_2$ [g/10 min] | 3.23 | 0.61 | 0.62 | 0.09 | 3.5 |
| XS [wt %] | 2.4 | 3.2 | 2.4 | 9.0 | 1.1 |
| GPR-Polymerisation | | | | | |
| Temperature [° C.] | 85 | 85 | 85 | 85 | 85 |
| Pressure [kPa] | 2759 | 2700 | 2672 | 1600 | 3099 |
| Residence time [h] | 1.15 | 1.17 | 1.05 | 0.66 | 1.63 |
| $C_2/C_3$ [mol/kmol] | 67 | 85 | 66 | 33 | 118 |
| Split [%] | 54 | 52 | 48 | 49 | 49.5 |
| $C_2$-content | 2.4 | 2.6 | 2.5 | 3.8 | 2.4 |
| $MFR_2$ [g/10 min] | 0.63 | 0.46 | 0.46 | 0.42 | 2.0 |
| XS [wt %] | 3.1 | 4.7 | 6.0 | 6.3 | 1.0 |
| Product | | | | | |
| PP pellet XS [%] | 3.7 | 5.7 | 3.6 | 6.8 | 1.6 |
| PP pellet $C_2$-content | 1.6 | 2.6 | 2.0 | 3.6 | 2.0 |
| PP pellet $MFR_2$ [g/10 min] | 0.35 | 0.37 | 0.35 | 0.32 | 1.5 |
| Tm [° C.] | 149.8 | 146.8 | 147.5 | 146.3 | 143.7 |
| Tc [° C.] | 119.3 | 116.2 | 114.9 | 114.7 | 103.1 |

TABLE 6

Properties:

|  | IE6 | IE7 | IE8 | CE7 | CE8 |
|---|---|---|---|---|---|
| randomness [%] | 100% | 96.8% | 99.1% | 86.7% | 99% |
| NIS @23° C. [kJ/m²] | 39 | 44 | 40 | 20 | 10.5 |
| NIS @0° C. [kJ/m²] | 4.4 | 5.4 | 3.4 | 3.5 | 3.4 |
| E [MPa] | 1140 | 980 | 1080 | 900 | 920 |
| Haze % @ 1 mm | 24 | 24 | 24 | 43 | 53 |

It can be seen that in terms of the tensile modulus and Charpy, notched at room temperature (RT) IE6 to IE8 compared to CE7 have clearly better properties than the comparative example.

INVENTIVE EXAMPLES IE9 and COMPARATIVE EXAMPLE CE9

One homo-PP was produced in a Borstar® Pilot Plant comprising a prepolymerisation reactor, a loop reactor and a gas phase reactor connected in series using a mixture of ZN-catalyst $a_4$) and mc-catalyst $b_1$). As comparative example CE9 one homo-PP was produced using mc-catalyst $b_1$).

In all cases hydrogen was fed in an amount necessary to reach the targeted MFR values.

The two catalysts were mixed into oil (Mineral oil; Primol 352) in the catalyst feed tank so that the catalyst content in the oil was 1.0 wt-%. Said mixture of catalyst and oil was fed continuously by pump into the polymerisation process.

TABLE 6

Reaction parameters

|  | IE9 | CE9 |
|---|---|---|
| ZN/mc Catalyst wt %/wt % | 10/90 | 0/100 |
| Prepolymerisation | | |
| Temperature [° C.] | 30 | 30 |
| Pressure [kPa] | 5113 | 5100 |
| Residence time [h] | 0.36 | 0.49 |
| Catalyst feed [g/h] | 5.05 | 4.25 |
| Loop-Polymerisation | | |
| Temperature [° C.] | 69 | 65 |
| Pressure [kPa] | 5271 | 5255 |
| Residence time | 0.32 | 0.46 |
| Split [%] | 52 | 55 |
| $MFR_2$ [g/10 min] | 2.85 | 1.50 |
| XS [wt %] | 1.6 | 1.2 |
| GPR-Polymerisation | | |
| Temperature [° C.] | 85 | 85 |
| Pressure [kPa] | 2859 | 3110 |
| Residence time [h] | 1.1 | 1.77 |
| Split [%] | 48 | 45 |
| $MFR_2$ [g/10 min] | 0.41 | 0.40 |
| XS [wt %] | 1.6 | 1.1 |
| Product | | |
| PP pellet r XS [%] | 1.2 | 1.2 |
| PP pellet $MFR_2$ [g/10 min] | 0.33 | 0.29 |
| Tm [° C.] | 155.5 | 152.8 |
| Tc [° C.] | 123.1 | 116 |

TABLE 7

Properties:

|  | IE9 | CE9 |
|---|---|---|
| mmmm [%] | 98.7 | 99 |
| NIS @23° C. [kJ/m²] | 7.9 | 15 |
| NIS @0° C. [kJ/m²] | 3.1 | 4.0 |
| E [MPa] | 1550 | 1350 |
| Haze % @ 1 mm | 24 | 40 |

The invention claimed is:

1. Propylene homo- or copolymer composition obtained in the presence of a catalyst mixture comprising: a Ziegler-Natta catalyst system and a metallocene catalyst system, the composition comprising an in-situ reactor blend of a Ziegler-Natta catalyzed, nucleated polypropylene (znPP) and a metallocene catalyzed polypropylene (mcPP), in a weight ratio in the range of 6:94 to 50:50 (wt % znPP:wt % mcPP) said propylene homo- or copolymer composition is endowed with the following features:
   a) a $MFR_2$ according to ISO 1133 (230° C., 2.16kg) in the range of 0.01 to 500 g/10min,
   b) a comonomer-content (determined with FTIR) in the range of 0.0to 8.0 wt %,
   c) xylene cold solubles (XCS) determined at 23 ° C. according to ISO 6427of less than 10.0 wt %,
   d) in case of propylene homopolymers with isotactic pentads (mmmm) measured by $^{13}$C-NMR higher than 90%,
   e) a melting temperature $T_m$ measured by DSC between 135° C. to 170° C.,
   f) a crystallization temperature $T_c$ measured by DSC between 100° C. to 135° C., and
   g) in case of propylene copolymers with a randomness measured by FTIR higher than 95%.

2. Propylene homo- or copolymer composition according to claim 1 having:
- a tensile modulus (E) measured according to ISO 527-2 in the range of 500 to 3000 MPa,
- a Charpy notched impact strength (NIS) determined according to ISO 179-1eA:2000 at 23° C. in the range of 0.3 to 55 kJ/m$^2$ and at 0° C. in the range of 0.3 to 10 kJ/m$^2$, and
- haze values according to ASTM D 1003 (1mm placque) in the range of 5 to 55 %.

3. Propylene homo- or copolymer composition according to claim 1, wherein the composition is either:
- a propylene homopolymer composition comprising an in-situ reactor blend of a znPP-homopolymer and a mcPP-homopolymer, or
- a propylene copolymer composition comprising an in-situ reactor blend of a znPP-copolymer and a mcPP-copolymer.

4. Propylene homo- or copolymer composition according to claim 1, wherein the Ziegler-Natta catalyst system for obtaining the Ziegler-Natta catalyzed, nucleated polypropylene comprises:
- ($a_1$) a Ziegler-Natta procatalyst,
- ($a_2$) a cocatalyst, and
- ($a_3$) an external donor,
- the Ziegler-Natta catalyst system being modified with a vinyl compound of formula (V) $CH_2=CH-CHR^7R^8$, wherein $R^7$ and $R^8$ together form a 5- or 6-membered saturated, unsaturated or aromatic ring or independently represent an alkyl group comprising 1 to 4 carbon atoms.

5. Propylene homo- or copolymer composition according to claim 4, wherein the Ziegler-Natta procatalyst contains a trans-esterification product of a $C_1$-$C_4$-alcohol and a phthalic ester as internal donor.

6. Propylene homo- or copolymer composition according to claim 5, wherein the Ziegler-Natta procatalyst is prepared by:
- a) reacting a spray crystallized or emulsion solidified adduct of $MgCl_2$ and a $C_1$-$C_4$-alcohol with $TiCl_4$;
- b) reacting the product of stage a) with a dialkylphthalate of formula (I):

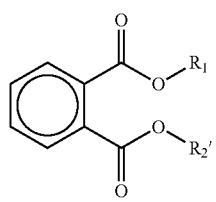

(I)

wherein $R_1'$ and $R_2'$ are independently at least a $C_5$-alkyl, under conditions where a transesterification between said $C_1$-$C_4$-alcohol and said dialkylphthalate of formula (I) takes place to form the internal donor,
- c) washing the product of stage b) and
- d) optionally reacting the product of step c) with additional $TiCl_4$.

7. Propylene homo- or copolymer composition according to claim 4, wherein the used external donor is represented by formula (III) and/or (IV)

$$Si(OCH_2CH_3)_3(NR^3R^4) \quad \text{(III)}$$

$$R^5{}_nR^6{}_mSi(OR^7)_z \quad \text{(IV)}$$

wherein $R^3$ and $R^4$ can be the same or different and represent a hydrocarbon group having 1 to 12 carbon atoms and $R^5$ and $R^6$ can be the same or different and represent a hydrocarbon group having 1 to 12 carbon atoms, $R^7$ is methyl or ethyl, z is 2 or 3 with the proviso that n+m+z=4.

8. Propylene homo- or copolymer composition according to claim 4, wherein the used cocatalyst is selected from trialkylaluminum, dialkyl aluminum chloride and alkyl aluminum sesquichloride.

9. Propylene homo- or copolymer composition according to claim 1, wherein the metallocene catalyst system for obtaining the metallocene catalyzed polypropylene comprises:
- ($b_1$) a metallocene compound of formula (VI)

$$R_n(Cp')_2MX_2 \quad \text{(VI)}$$

wherein
- "M" is zirconium (Zr) or hafnium (Hf),
- each "X" is independently a monovalent anionic σ-ligand,
- each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
- "R" is a bivalent bridging group linking said organic ligands (Cp'), and
- "n" is 1 or 2, and
- ($b_2$) a cocatalyst.

10. Propylene homo- or copolymer composition according to claim 9, wherein the cocatalyst is an aluminoxane.

11. Propylene homo- or copolymer composition according to claim 9, wherein the metallocene catalyst system used is obtained by the emulsion/solidification technology.

12. Propylene homo- or copolymer composition according to claim 11, wherein the metallocene catalyst system used is obtained by:
- a) preparing a solution of one or more catalyst components selected from the metallocene compound ($b_1$) and the cocatalyst ($b_2$) in a solvent;
- b) dispersing said solution in a second solvent to form an emulsion in which said one or more catalyst components are present in the droplets of the dispersed phase, and
- c) solidifying said dispersed phase to convert said droplets to solid particles and optionally recovering said particles to obtain said catalyst system.

13. A method comprising: using a catalyst mixture comprising:
- (a) 5 to 40 wt % of a Ziegler-Natta catalyst system comprising
  - ($a_1$) a Ziegler-Natta procatalyst,
  - ($a_2$) a cocatalyst and
  - ($a_3$) an external donor,
  - the Ziegler-Natta catalyst system being modified with a vinyl compound of formula (V) $CH_2=CH-CHR^7R^8$, wherein $R^7$ and $R^8$ together form a 5- or 6-membered saturated, unsaturated or aromatic ring or independently represent an alkyl group comprising 1 to 4 carbon atoms and
- (b) 95 to 60 wt % of a metallocene catalyst system comprising
  - ($b_1$) a metallocene compound of formula (VI)

$$R_n(Cp')_2MX_2 \quad \text{(VI)}$$

wherein

"M" is zirconium (Zr) or hafnium (Hf), each "X" is independently a monovalent anionic σ-ligand, each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M), "R" is a bivalent bridging group linking said organic ligands (Cp'), and "n" is 1 or 2, and (b$_2$) a cocatalyst, for the production of a propylene homo- or copolymer composition being an in-situ reactor blend of a Ziegler-Natta catalysed, nucleated polypropylene (znPP) and a metallocene catalysed polypropylene (mcPP), said propylene homo- or copolymer composition being endowed with the following features:

a) a MFR$_2$ according to ISO 1133 (230° C., 2.16kg) in the range of 0.01 to 500 g/10min, b) a comonomer-content (determined with FTIR) in the range of 0.0 to 8.0 wt %, c) xylene cold solubles (XCS) determined at 23 ° C. according to ISO 6427of less than 10.0 wt %, d) in case of propylene homopolymers with isotactic pentads (mmmm) measured by $^{13}$C-NMR higher than 90%, e) a melting temperature T$_m$ measured by DSC between 135° C. to 170° C. and, f) a crystallisation temperature T$_c$ measured by DSC between 100° C. to 135° C., g) in case of propylene copolymers with a randomness measured by FTIR higher than 95%, wherein the method comprises contacting the catalyst mixture with propylene and an optional additional monomer under copolymerization conditions to form the propylene homo- or copolymer composition.

* * * * *